US012570112B2

(12) United States Patent
Takemori et al.

(10) Patent No.: US 12,570,112 B2
(45) Date of Patent: Mar. 10, 2026

(54) PNEUMATIC TIRE

(71) Applicant: The Yokohama Rubber Co., LTD.,
Tokyo (JP)

(72) Inventors: Ryohei Takemori, Hiratsuka (JP);
Hiraku Kouda, Hiratsuka (JP);
Masaaki Nagayasu, Hiratsuka (JP);
Yuki Sasaya, Hiratsuka (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 1114 days.

(21) Appl. No.: 17/256,163

(22) PCT Filed: Apr. 17, 2019

(86) PCT No.: PCT/JP2019/016496
§ 371 (c)(1),
(2) Date: Dec. 24, 2020

(87) PCT Pub. No.: WO2020/008699
PCT Pub. Date: Jan. 9, 2020

(65) Prior Publication Data
US 2021/0260935 A1 Aug. 26, 2021

(30) Foreign Application Priority Data
Jul. 2, 2018 (JP) ................................. 2018-126031

(51) Int. Cl.
B60C 13/02 (2006.01)
B60C 13/00 (2006.01)
(52) U.S. Cl.
CPC ............ B60C 13/002 (2013.01); B60C 13/02
(2013.01); B60C 2013/007 (2013.01)

(58) Field of Classification Search
CPC ....... B60C 13/02; B60C 13/00; B60C 13/002;
B60C 13/007
See application file for complete search history.

(56) References Cited

U.S. PATENT DOCUMENTS

2011/0088826 A1 4/2011 Watanabe
2011/0094646 A1* 4/2011 Watanabe ............... B60C 13/02
152/523

(Continued)

FOREIGN PATENT DOCUMENTS

JP H11-291721 10/1999
JP H11291721 A * 10/1999

(Continued)

OTHER PUBLICATIONS

International Search Report for International Application No. PCT/
JP2019/016496 dated Jul. 2, 2019, 4 pages, Japan.

*Primary Examiner* — Katelyn W Smith
*Assistant Examiner* — Thomas Frank Schneider
(74) *Attorney, Agent, or Firm* — Thorpe North & Western

(57) ABSTRACT
A pneumatic tire includes protrusion portions formed on a side portion of tire side portions located on both sides in a width direction, projecting from a side surface of the side portion, and extending along the side surface, the protrusion portions including a bend portion where a direction in which the protrusion portions extend changes, and also including extending portions defined by the bend portion, a width of the extending portions changing at a position straddling the bend portion, a first extending portion having the longest length among the extending portions having a maximum width of no less than 1.0 mm and no more than 3.0 mm, and a thickness of the side portion at a maximum tire width position being no less than 2 mm and no more than 9 mm.

18 Claims, 24 Drawing Sheets

(56)                    References Cited

U.S. PATENT DOCUMENTS

| | | |
|---|---|---|
| 2013/0014877 A1 | 1/2013 | Ahn et al. |
| 2017/0210182 A1 | 7/2017 | Mori et al. |
| 2018/0126798 A1 | 5/2018 | Kodama et al. |

FOREIGN PATENT DOCUMENTS

| | | | | |
|---|---|---|---|---|
| JP | 2004-017828 | | | 1/2004 |
| JP | 2005-289143 | | | 10/2005 |
| JP | 2008-265453 | A | | 11/2008 |
| JP | 2013-018474 | | | 1/2013 |
| JP | 5147324 | | | 2/2013 |
| JP | 5147324 | B2 | * | 2/2013 |
| JP | 2013-071634 | | | 4/2013 |
| JP | 2013071634 | A | * | 4/2013 |
| JP | 2013095233 | A | * | 5/2013 |
| JP | 2015-212117 | | | 11/2015 |
| JP | 5849572 | | | 1/2016 |
| JP | 2016-107935 | | | 6/2016 |
| JP | 2017024562 | A | * | 2/2017 |
| JP | 2017-128267 | | | 7/2017 |
| WO | WO 2009/142127 | | | 11/2009 |
| WO | WO 2016/181940 | | | 11/2016 |

* cited by examiner

| | Conventional Example 1 | Conventional Example 2 | Example 1 | Example 2 |
|---|---|---|---|---|
| Tire side portion thickness Ga (mm) | 4 | 4 | 4 | 4 |
| Presence of bend portion | No | Yes | Yes | Yes |
| Width of first extending portion (mm) | 3 | Not constant | Not constant | Not constant |
| Presence/absence of change in width of extending portion at a position across bend portion | - | No | Yes | Yes |
| Maximum width of first extending portion (mm) | - | 4 | 1 | 1 |
| Maximum width of second extending portion (mm) | - | 2.5 | 0.5 | 2.5 |
| Maximum width of second extending portion/maximum width of first extending portion (times) | - | - | 0.5 | 2.5 |
| Maximum height of first extending portion (mm) | - | 0.5 | 0.5 | 0.5 |
| Maximum height of first extending portion/maximum width of first extending portion (times) | - | 0.125 | 0.5 | 0.5 |
| Maximum height of second extending portion (mm) | - | 1.5 | 1.5 | 1.5 |
| Maximum height of second extending portion/maximum width of second extending portion (times) | - | 0.6 | 3.0 | 0.6 |
| Angle θ1 (deg) formed by first and second extending portions | - | 120 | 80 | 80 |
| Length of first extending portion/length of second extending portion (times) | - | - | 31 | 31 |
| Position of first extending portion in tire radial direction | - | Outermost side | Innermost side | Innermost side |
| Number of bend portions (sections) | 0 | 1 | 1 | 1 |
| Length of first extending portion/length of third extending portion (times) | - | - | - | - |
| Angle (deg) formed by second extending portion and third extending portion | - | - | - | - |
| Angle formed by third extending portion and fourth extending portion (deg) | - | - | - | - |
| Relationship between first extending portion and third extending portion | - | - | - | - |
| Number of bend portions continuous with first extending portion (sections) | - | 1 | 1 | 1 |
| Position of minimum height of first extending portion | - | Center portion | Center portion | Center portion |
| Height change of first extending portion | - | Both end portions high | Both end portions high | Both end portions high |
| Fuel economy performance | 90 | 100 | 103 | 103 |
| Scratch resistance | 100 | 100 | 103 | 104 |

FIG. 24A

| | Example 3 | Example 4 | Example 5 | Example 6 |
|---|---|---|---|---|
| Tire side portion thickness Ga (mm) | 4 | 4 | 4 | 4 |
| Presence of bend portion | Yes | Yes | Yes | Yes |
| Width of first extending portion (mm) | 1 | 1 | 1 | 1 |
| Presence/absence of change in width of extending portion at a position across bend portion | Yes | Yes | Yes | Yes |
| Maximum width of first extending portion (mm) | 1 | 1 | 1 | 1 |
| Maximum width of second extending portion (mm) | 2.5 | 2.5 | 5.5 | 2.5 |
| Maximum width of second extending portion/maximum width of first extending portion (times) | 2.5 | 2.5 | 5.5 | 2.5 |
| Maximum height of first extending portion (mm) | 0.5 | 5.5 | 1.5 | 1.5 |
| Maximum height of first extending portion/maximum width of first extending portion (times) | 0.5 | 5.5 | 1.5 | 1.5 |
| Maximum height of second extending portion (mm) | 1.5 | 1.5 | 1.5 | 1.5 |
| Maximum height of second extending portion/maximum width of second extending portion (times) | 0.6 | 0.6 | 0.3 | 0.6 |
| Angle $\theta 1$ (deg) formed by first and second extending portions | 80 | 80 | 80 | 80 |
| Length of first extending portion/length of second extending portion (times) | 31 | 31 | 31 | 31 |
| Position of first extending portion in tire radial direction | Innermost side | Innermost side | Innermost side | Innermost side |
| Number of bend portions (sections) | 1 | 1 | 1 | 1 |
| Length of first extending portion/length of third extending portion (times) | - | - | - | - |
| Angle (deg) formed by second extending portion and third extending portion | - | - | - | - |
| Angle formed by third extending portion and fourth extending portion (deg) | - | - | - | - |
| Relationship between first extending portion and third extending portion | - | - | - | - |
| Number of bend portions continuous with first extending portion (sections) | 1 | 1 | 1 | 1 |
| Position of minimum height of first extending portion | Center portion | Center portion | Center portion | Center portion |
| Height change of first extending portion | Both end portions high | Both end portions high | Both end portions high | Both end portions high |
| Fuel economy performance | 103 | 102 | 101 | 104 |
| Scratch resistance | 105 | 106 | 106 | 105 |

FIG. 24B

| | Example 7 | Example 8 | Example 9 | Example 10 |
|---|---|---|---|---|
| Tire side portion thickness Ga (mm) | 4 | 4 | 4 | 4 |
| Presence of bend portion | Yes | Yes | Yes | Yes |
| Width of first extending portion (mm) | 1 | 1 | 1 | 1 |
| Presence/absence of change in width of extending portion at a position across bend portion | Yes | Yes | Yes | Yes |
| Maximum width of first extending portion (mm) | 1 | 1 | 1 | 1 |
| Maximum width of second extending portion (mm) | 2.5 | 2.5 | 2.5 | 2.5 |
| Maximum width of second extending portion/maximum width of first extending portion (times) | 2.5 | 2.5 | 2.5 | 2.5 |
| Maximum height of first extending portion (mm) | 1.5 | 1.5 | 1.5 | 1.5 |
| Maximum height of first extending portion/maximum width of first extending portion (times) | 1.5 | 1.5 | 1.5 | 1.5 |
| Maximum height of second extending portion (mm) | 7.8 | 5.0 | 5.0 | 5.0 |
| Maximum height of second extending portion/maximum width of second extending portion (times) | 3.1 | 2.0 | 2.0 | 2.0 |
| Angle $\theta 1$ (deg) formed by first and second extending portions | 80 | 80 | 120 | 120 |
| Length of first extending portion/length of second extending portion (times) | 31 | 31 | 31 | 1.4 |
| Position of first extending portion in tire radial direction | Innermost side | Innermost side | Innermost side | Innermost side |
| Number of bend portions (sections) | 1 | 1 | 1 | 1 |
| Length of first extending portion/length of third extending portion (times) | - | - | - | - |
| Angle (deg) formed by second extending portion and third extending portion | - | - | - | - |
| Angle formed by third extending portion and fourth extending portion (deg) | - | - | - | - |
| Relationship between first extending portion and third extending portion | - | - | - | - |
| Number of bend portions continuous with first extending portion (sections) | 1 | 1 | 1 | 1 |
| Position of minimum height of first extending portion | Center portion | Center portion | Center portion | Center portion |
| Height change of first extending portion | Both end portions high | Both end portions high | Both end portions high | Both end portions high |
| Fuel economy performance | 103 | 105 | 106 | 105 |
| Scratch resistance | 106 | 105 | 105 | 105 |

FIG. 24C

| | Example 11 | Example 12 | Example 13 | Example 14 |
|---|---|---|---|---|
| Tire side portion thickness Ga (mm) | 4 | 4 | 4 | 4 |
| Presence of bend portion | Yes | Yes | Yes | Yes |
| Width of first extending portion (mm) | 1 | 1 | 1 | 1 |
| Presence/absence of change in width of extending portion at a position across bend portion | Yes | Yes | Yes | Yes |
| Maximum width of first extending portion (mm) | 1 | 1 | 1 | 1 |
| Maximum width of second extending portion (mm) | 2.5 | 2.5 | 2.5 | 2.5 |
| Maximum width of second extending portion/maximum width of first extending portion (times) | 2.5 | 2.5 | 2.5 | 2.5 |
| Maximum height of first extending portion (mm) | 1.5 | 1.5 | 1.5 | 1.5 |
| Maximum height of first extending portion/maximum width of first extending portion (times) | 1.5 | 1.5 | 1.5 | 1.5 |
| Maximum height of second extending portion (mm) | 5.0 | 5.0 | 5.0 | 5.0 |
| Maximum height of second extending portion/maximum width of second extending portion (times) | 2.0 | 2.0 | 2.0 | 2.0 |
| Angle $\theta 1$ (deg) formed by first and second extending portions | 120 | 120 | 120 | 120 |
| Length of first extending portion/length of second extending portion (times) | 11 | 11 | 11 | 11 |
| Position of first extending portion in tire radial direction | Innermost side | Outermost side | Outermost side | Outermost side |
| Number of bend portions (sections) | 1 | 1 | 2 | 2 |
| Length of first extending portion/length of third extending portion (times) | - | - | 26 | 1.1 |
| Angle (deg) formed by second extending portion and third extending portion | - | - | 80 | 80 |
| Angle formed by third extending portion and fourth extending portion (deg) | - | - | - | - |
| Relationship between first extending portion and third extending portion | - | - | Not parallel | Not parallel |
| Number of bend portions continuous with first extending portion (sections) | 1 | 1 | 1 | 1 |
| Position of minimum height of first extending portion | Center portion | Center portion | Center portion | Center portion |
| Height change of first extending portion | Both end portions high | Both end portions high | Both end portions high | Both end portions high |
| Fuel economy performance | 107 | 108 | 109 | 109 |
| Scratch resistance | 105 | 105 | 106 | 105 |

FIG. 24D

| | Example 15 | Example 16 | Example 17 |
|---|---|---|---|
| Tire side portion thickness Ga (mm) | 4 | 4 | 4 |
| Presence of bend portion | Yes | Yes | Yes |
| Width of first extending portion (mm) | 1 | 1 | 1 |
| Presence/absence of change in width of extending portion at a position across bend portion | Yes | Yes | Yes |
| Maximum width of first extending portion (mm) | 1 | 1 | 1 |
| Maximum width of second extending portion (mm) | 2.5 | 2.5 | 2.5 |
| Maximum width of second extending portion/maximum width of first extending portion (times) | 2.5 | 2.5 | 2.5 |
| Maximum height of first extending portion (mm) | 1.5 | 1.5 | 1.5 |
| Maximum height of first extending portion/maximum width of first extending portion (times) | 1.5 | 1.5 | 1.5 |
| Maximum height of second extending portion (mm) | 5.0 | 5.0 | 5.0 |
| Maximum height of second extending portion/maximum width of second extending portion (times) | 2.0 | 2.0 | 2.0 |
| Angle θ1 (deg) formed by first and second extending portions | 120 | 120 | 120 |
| Length of first extending portion/length of second extending portion (times) | 11 | 11 | 11 |
| Position of first extending portion in tire radial direction | Outermost side | Outermost side | Outermost side |
| Number of bend portions (sections) | 2 | 3 | 3 |
| Length of first extending portion/length of third extending portion (times) | 9 | 9 | 9 |
| Angle (deg) formed by second extending portion and third extending portion | 80 | 120 | 120 |
| Angle formed by third extending portion and fourth extending portion (deg) | - | 120 | 120 |
| Relationship between first extending portion and third extending portion | Not parallel | Not parallel | Parallel |
| Number of bend portions continuous with first extending portion (sections) | 1 | 1 | 1 |
| Position of minimum height of first extending portion | Center portion | Center portion | Center portion |
| Height change of first extending portion | Both end portions high | Both end portions high | Both end portions high |
| Fuel economy performance | 110 | 111 | 112 |
| Scratch resistance | 106 | 106 | 106 |

FIG. 24E

|  | Example 18 | Example 19 | Example 20 |
|---|---|---|---|
| Tire side portion thickness Ga (mm) | 4 | 4 | 4 |
| Presence of bend portion | Yes | Yes | Yes |
| Width of first extending portion (mm) | 1 | 1 | 1 |
| Presence/absence of change in width of extending portion at a position across bend portion | Yes | Yes | Yes |
| Maximum width of first extending portion (mm) | 1 | 1 | 1 |
| Maximum width of second extending portion (mm) | 2.5 | 2.5 | 2.5 |
| Maximum width of second extending portion/maximum width of first extending portion (times) | 2.5 | 2.5 | 2.5 |
| Maximum height of first extending portion (mm) | 1.5 | 1.5 | 1.5 |
| Maximum height of first extending portion/maximum width of first extending portion (times) | 1.5 | 1.5 | 1.5 |
| Maximum height of second extending portion (mm) | 5.0 | 5.0 | 5.0 |
| Maximum height of second extending portion/maximum width of second extending portion (times) | 2.0 | 2.0 | 2.0 |
| Angle θ1 (deg) formed by first and second extending portions | 120 | 120 | 120 |
| Length of first extending portion/length of second extending portion (times) | 11 | 11 | 11 |
| Position of first extending portion in tire radial direction | Outermost side | Outermost side | Outermost side |
| Number of bend portions (sections) | 3 | 3 | 3 |
| Length of first extending portion/length of third extending portion (times) | 9 | 9 | 9 |
| Angle (deg) formed by second extending portion and third extending portion | 120 | 120 | 120 |
| Angle formed by third extending portion and fourth extending portion (deg) | 120 | 120 | 120 |
| Relationship between first extending portion and third extending portion | Parallel | Parallel | Parallel |
| Number of bend portions continuous with first extending portion (sections) | 2 | 1 | 1 |
| Position of minimum height of first extending portion | Center portion | End portion without bend portion | End portion without bend portion |
| Height change of first extending portion | Both end portions high | Only end portion is low | Gradually becomes low |
| Fuel economy performance | 111 | 113 | 114 |
| Scratch resistance | 106 | 106 | 106 |

FIG. 24F

PNEUMATIC TIRE

TECHNICAL FIELD

The present technology relates to a pneumatic tire.

BACKGROUND ART

In recent years, technologies have been proposed in which convex fins are provided on a tire side portion in order to improve fuel economy by heat dissipation and aerodynamic effects. For example, in Japan Patent Nos. 5147324 and 5849572, Japan Unexamined Patent Publication Nos. 2013-018474 and 2015-212117, and International Patent Publication No. WO 2016/181940, by providing convex fins on the tire side portion, and by devising the position, shape, and the like of the fins, a temperature reduction effect (Japan Patent No. 5147324), an improvement in fuel economy performance (Japan Patent No. 5849572), an improvement in aerodynamic performance (Japan Unexamined Patent Publication No. 2013-018474), an improvement in running performance of the vehicle (Japan Unexamined Patent Publication No. 2015-212117), and a reduction of air resistance (International Patent Publication No. WO 2016/181940) are possible.

One effect of providing fins on the tire side portion is improved fuel economy performance as described in Japan Patent No. 5849572. In other words, by providing the fins on the tire side portion, turbulent flow is generated when the tire is rotating, an increase in air resistance is suppressed, and rolling resistance is reduced, whereby fuel economy performance may be improved. However, in order to obtain the effect of improved fuel economy performance by providing fins more effectively, increasing the size of the fins increases the mass of the fins and increases the mass of the entire tire. In this case, even though fins are provided, the effect of improving fuel economy performance may be difficult to obtain.

On the other hand, when the size of the fins is reduced in order to suppress an increase in mass, it becomes difficult to sufficiently obtain an aerodynamic effect, making it difficult to generate turbulent flow. And therefore, this also makes it difficult to obtain the effect of improving fuel economy performance. Moreover, when the thickness of the tire side portion is made thinner in order to suppress an increase in mass while providing large fins for the purpose of improving fuel economy performance, scratch resistance will be easily deteriorated. As such, it has become very difficult to effectively improve fuel economy performance without diminishing scratch resistance.

SUMMARY

The present technology provides a pneumatic tire that can provide both scratch resistance and fuel economy performance in a compatible manner.

A pneumatic tire includes a plurality of protrusion portions formed on at least one tire side portion of tire side portions located on both sides in a tire width direction, the protrusion portions projecting from a tire side surface that is a surface of the tire side portion and extending along the tire side surface, the protrusion portions including at least one bend portion at a position where a direction in which the protrusion portions extend changes, and also including a plurality of extending portions defined by the bend portion, a width of the plurality of extending portions changing at a position straddling the bend portion, a first extending portion, which is the extending portion having the longest length among the plurality of extending portions, having a maximum width within a range of no less than 1.0 mm and no more than 3.0 mm, and a thickness of the tire side portion at a maximum tire width position being within a range of no less than 2 mm and no more than 9 mm.

In the pneumatic tire described above, preferably a second extending portion that is the extending portion continuous from the first extending portion via the bend portion has a maximum width that is larger than a maximum width of the first extending portion.

In the pneumatic tire described above, preferably the maximum width of the second extending portion is within a range of no less than 1.5 and no more than 5 times a maximum width of the first extending portion.

In the pneumatic tire described above, preferably a maximum height of the second extending portion is in a range of no less than 1.1 and no more than 3.0 times a maximum width of the second extending portion.

In the pneumatic tire described above, preferably an angle $\theta 1$ formed by a center line in a width direction of the first extending portion and a center line in a width direction of the second extending portion is within a range $90° \leq \theta 1 \leq 170°$.

In the pneumatic tire described above, preferably the length of the first extending portion is within a range of no less than 1.5 and no more than 30 times a length of the second extending portion.

In the pneumatic tire described above, preferably the plurality of extending portions are such that in one of the extending portions, a width with respect to a maximum width of the extending portions is within a range of no less than 0.8 and no more than 1.0 times the maximum width of the extending portion.

In the pneumatic tire described above, preferably the maximum height of the first extending portion is within a range of no less than 1.1 and no more than 5.0 times a maximum width of the first extending portion.

In the pneumatic tire described above, preferably the first extending portion is disposed on an outermost side in a tire radial direction among the plurality of extending portions.

In the pneumatic tire described above, preferably the protrusion portions include a plurality of the bend portions.

In the pneumatic tire described above, preferably the protrusion portions are such that a length of the first extending portion is within a range of no less than 1.2 and no more than 25 times a length of the second extending portion that is the extending portion of the plurality of extending portions that is continuous from the first extending portion via the bend portion and a length of extending portions other than the first extending portion.

In the pneumatic tire described above, preferably the protrusion portions are such that an angle $\theta n$ formed by center lines in respective width directions of two extending portions continuous via the bend portion is within a range $90° \leq \theta n \leq 170°$.

In the pneumatic tire described above, preferably the protrusion portions include a second extending portion that is an extending portion continuous from the first extending portion via the bend portion and a third extending portion that is an extending portion continuous from the second extending portion via the bend portion, and the first extending portion and the third extending portion are such that the center line in the width direction of the first extending portion and a center line in a width direction of the third extending portion are substantially parallel to each other.

In the pneumatic tire described above, preferably the first extending portion is such that only one end portion side in the extending direction of the first extending portion is defined by the bend portion.

In the pneumatic tire described above, preferably the first extending portion is such that a height from the tire side surface is lowest at a position of an end portion on an outer side in the tire radial direction.

In the pneumatic tire described above, preferably the first extending portion is such that the height from the tire side surface decreases going toward the outer side in the tire radial direction.

The pneumatic tire according the present technology is able to achieve the effects of providing both scratch resistance and fuel economy performance in a compatible manner.

4 of a case in which the first extending portion is positioned further toward the inner side in the tire radial direction than the second extending portion.

Figure 19:
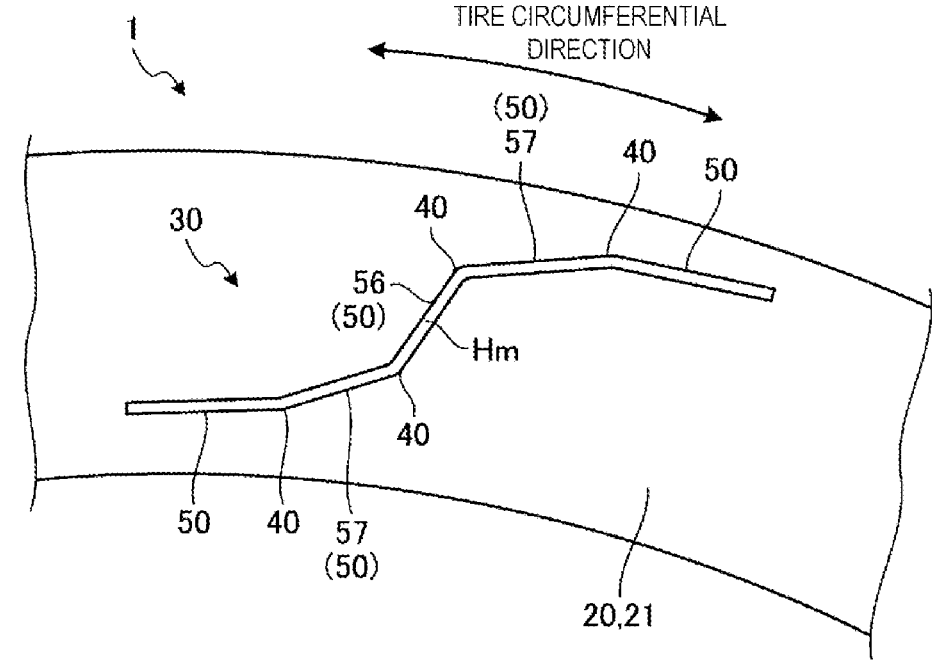

FIG. 19 is a modified example of a pneumatic tire according to an embodiment, and is an explanatory diagram of an average extending portion height of a plurality of extending portions of a protrusion portion including four bend portions.

Figure 20:
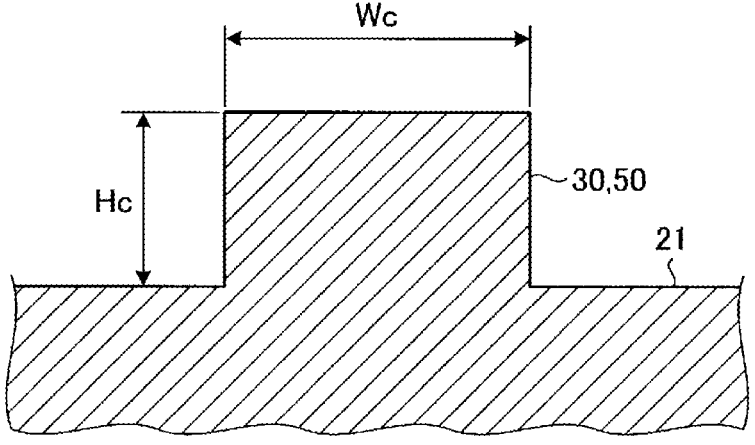

FIG. 20 is a modified example of a pneumatic tire according to an embodiment, and is an explanatory diagram of a case in which the cross-sectional shape of the protrusion portion is formed into a rectangular shape having a lateral length.

Figure 21:
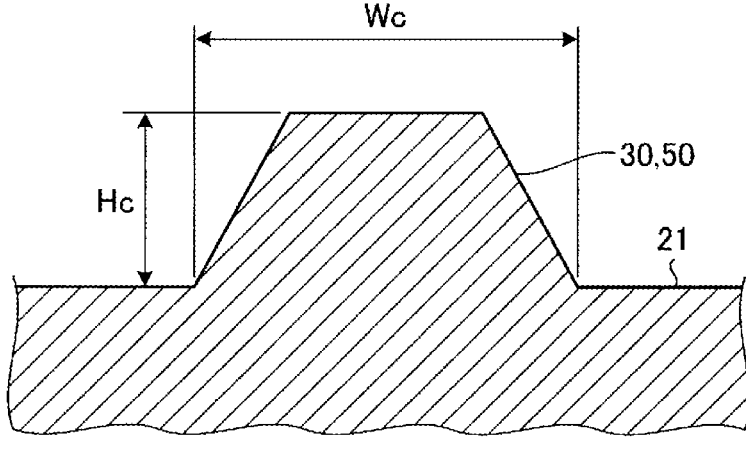

FIG. 21 is a modified example of a pneumatic tire according to an embodiment, and is an explanatory diagram of a case in which the cross-sectional shape of the protrusion portion is formed into a trapezoidal shape.

Figure 22:
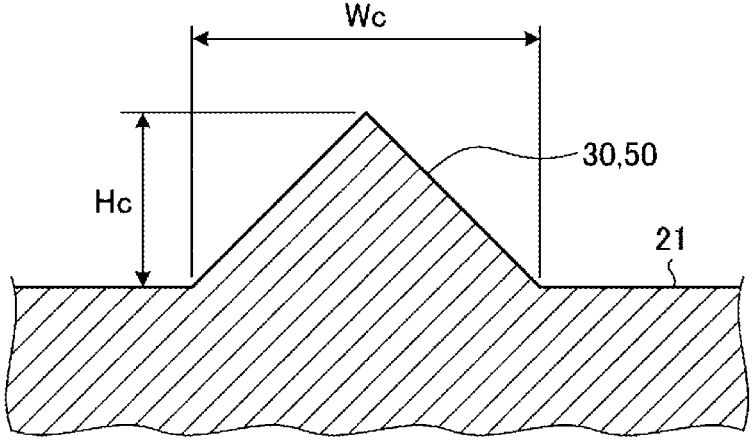

FIG. 22 is a modified example of a pneumatic tire according to an embodiment, and is an explanatory diagram of a case in which the cross-sectional shape of the protrusion portion is formed into a triangular shape.

Figure 23:
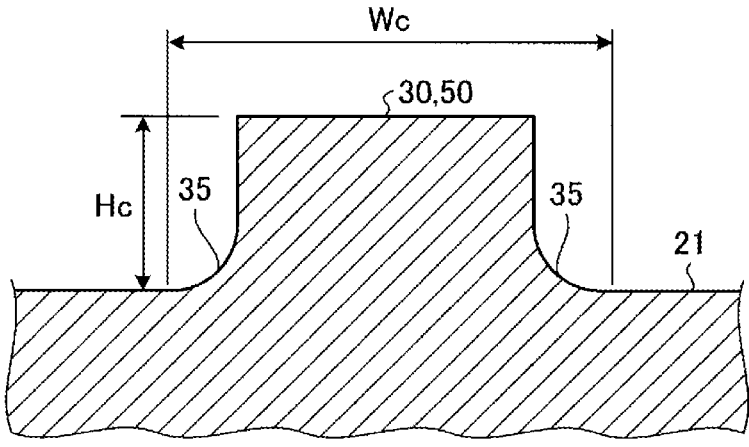

FIG. 23 is a modified example of a pneumatic tire according to an embodiment, and is an explanatory diagram of a case in which arc portions are formed at the base portion of the protrusion portion.

FIGS. 24A-24F are tables listing the results of performance tests of pneumatic tires.

DETAILED DESCRIPTION

Pneumatic tires according to embodiments of the present technology are described in detail below with reference to the drawings. However, the present technology is not limited by the embodiment. Constituents of the following embodiments include elements that are essentially identical or that can be substituted or easily conceived of by a person skilled in the art.

Embodiments

In the following description, the tire radial direction refers to a direction orthogonal to the rotation axis (not illustrated) of a pneumatic tire 1, the inner side in the tire radial direction refers to the side facing the rotation axis in the tire radial direction, and the outer side in the tire radial direction refers to the side away from the rotation axis in the tire radial direction. Moreover, the tire circumferential direction refers to the circumferential direction with the rotation axis as the central axis. Additionally, the tire width direction refers to a direction parallel with the rotation axis, the inner side in the tire width direction refers to a side toward the tire equatorial plane (tire equator line) CL in the tire width direction, and the outer side in the tire width direction refers to a side away from the tire equatorial plane CL in the tire width direction. The tire equatorial plane CL is a plane that is orthogonal to the rotation axis of the pneumatic tire 1 and passes through the center of the tire width of the pneumatic tire 1, and in the tire equatorial plane CL, the center line in the tire width direction, which is the center position of the pneumatic tire 1 in the tire width direction, coincides with the position in the tire width direction. The tire width is the width in the tire width direction between the outermost portions in the tire width direction excluding the protrusion portion 30 (see FIG. 1) described later, or in other words, is the distance between the portions farthest from the tire equatorial plane CL excluding the protrusion portion 30 in the tire width direction. "Tire equator line" refers to the line in the tire circumferential direction of the pneumatic tire 1 that lies on the tire equatorial plane CL. In the following description, a tire meridian cross-section refers to a section in which the tire is cut along a plane including the tire rotation axis.

Figure 1:
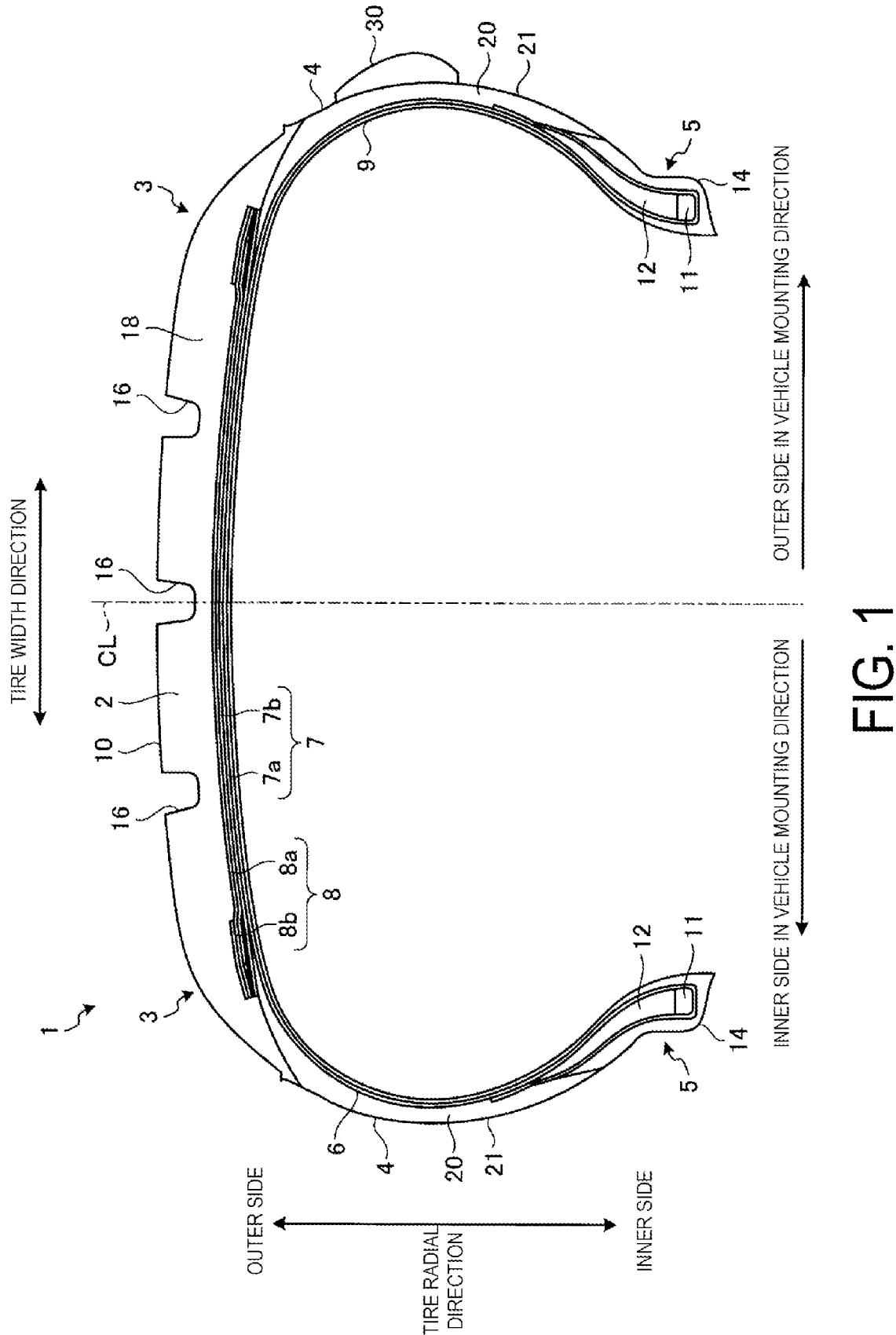
FIG. 1 is a tire meridian cross-sectional view illustrating a main portion of a pneumatic tire according to an embodiment.

FIG. 1 is a tire meridian cross-sectional view illustrating a main portion of a pneumatic tire 1 according to an embodiment. The pneumatic tire 1 illustrated in FIG. 1 has a specified mounting direction with respect to the vehicle, or in other words, the direction when mounted on the vehicle is specified. In other words, in the pneumatic tire 1 illustrated in FIG. 1, the side facing the inner side of the vehicle when mounted on the vehicle is the inner side in the vehicle mounting direction, and the side facing the outer side of the vehicle when mounted on the vehicle is the outer side in the vehicle mounting direction. It should be noted that designation of the inner side in the vehicle mounting direction and the outer side in the vehicle mounting direction are not limited to the case of being mounted on the vehicle. For example, in a case of being mounted on the rim, the directions of the rim with respect to the inner side and the outer side of the vehicle are determined, so in a case where the pneumatic tire 1 is mounted on a rim, the directions with respect to the inner side in the vehicle mounting direction and the outer side in the vehicle mounting direction are specified in the tire width direction. The pneumatic tire 1 includes a mounting direction indicator portion (not illustrated) that indicates the mounting direction with respect to a vehicle. The mounting direction indicator portion, for example, is constituted by a mark or recesses/protrusions provided on the sidewall portion 4 of the tire. For example, Economic Commission for Europe Regulation 30 (ECE R30) requires that a mounting direction indicator portion be provided on the sidewall portion 4 on the vehicle outer side when the tire is mounted on a vehicle. The pneumatic tire 1 according to the present embodiment is mainly used for passenger vehicles.

Moreover, the pneumatic tire 1 according to the present embodiment is a pneumatic tire 1 in which the rotation direction when mounted on a vehicle is designated, or in other words, the pneumatic tire 1 is mounted on a vehicle so as to rotate in a designated rotation direction around a rotation axis when the vehicle moves forward. The pneumatic tire 1 also has a rotation direction indicator portion (not illustrated) that indicates the rotation direction. The rotation direction indicator portion, for example, is constituted by a mark or recesses/protrusions provided on the sidewall portion 4 of the tire.

In the following description, the leading side in the tire rotation direction is the rotation direction side when the pneumatic tire 1 is rotated in the designated direction, in the case where the pneumatic tire 1 is mounted on a vehicle and is rotated in a designated direction when traveling, this is the side that first comes into contact with the road surface or moves away from the road surface first. In addition, the trailing side in the tire rotation direction is the opposite side to the rotation direction when the pneumatic tire 1 is rotated in the designated direction, and in a case where the pneumatic tire 1 is mounted on a vehicle and is rotated in a specified direction when traveling, this is the side that comes in contact with the road surface after the portion that is located on the leading side, or that separates from the road surface after the portion that is located on the leading side.

The pneumatic tire 1 according to this embodiment includes a tread portion 2, shoulder portions 3 on both sides of the tread portion 2, and sidewall portions 4 and bead portions 5 that are sequentially continuous from each shoulder portion 3. The pneumatic tire 1 also includes a carcass layer 6, a belt layer 7, a belt reinforcing layer 8, and an inner liner 9.

When viewed in a tire meridian cross-section, the tread portion 2 is formed in an annular shape extending in the tire circumferential direction at the outermost portion in the tire radial direction, and is exposed on the outermost side in the tire radial direction of the pneumatic tire 1, with the outer peripheral surface thereof becoming the contour of the pneumatic tire 1. The outer circumferential surface of the tread portion 2 is formed as a ground contact surface 10 that is a surface that can come into contact with a road surface mainly during traveling, and a plurality of grooves such as circumferential grooves 16 extending in the tire circumferential direction and lug grooves (not illustrated) extending in the tire width direction are formed on the contact surface 10. Furthermore, the tread portion 2 includes a tread rubber 18 that is a rubber composition. The tread rubber 18 may include a plurality of rubber compositions with different physical properties layered in the tire radial direction.

The shoulder portions 3 are portions of the tread portion 2 located on both outer sides in the tire width direction. Additionally, the sidewall portion 4 is located on the inner side in the tire radial direction of the shoulder portion 3, and a pair of the sidewall portions 4 are disposed on both sides in the tire lateral direction. That is, the pair of sidewall portions 4 are disposed on both sides of the tread portion 2 in the tire width direction, or in other words, the sidewall portions 4 are disposed at two locations on both sides of the pneumatic tire 1 in the tire width direction. The sidewall portions 4 formed in this manner are curved in a direction that protrudes outward in the tire width direction when viewed in a tire meridian cross-section, and are portions that are exposed to the outermost side in the tire width direction of the pneumatic tire 1.

Additionally, the bead portions 5 are disposed on the inner side in the tire radial direction of each of the pair of sidewall portions 4, and a pair of the bead portions 5 are disposed on both sides of the tire equatorial plane CL in the tire width direction. Each of the bead portions 5 includes a bead core 11 and a bead filler 12. The bead core 11 is formed by winding a bead wire, which is a steel wire, into a ring shape. The bead filler 12 is a rubber material that is disposed in the space formed by an end portion of the carcass layer 6 in the tire width direction being folded back at the position of the bead core 11.

These sidewall portions 4 and bead portions 5 are included in the tire side portion 20 located on both sides in the tire width direction. In the present embodiment, the tire side portion 20 refers to a region between a position on the inner side in the tire radial direction of the tread rubber 18 and a bead heel 14 that is an end portion on the inner circumferential surface of the bead portion 5 on the tire width direction outer side.

The end portions of the carcass layer 6 in the tire width direction are folded back around the pair of bead cores 11 from the inner side in the tire width direction to the outer side in the tire width direction, and the carcass layer 6 is stretched in a toroidal shape in the tire circumferential direction to form the framework of the tire. The carcass layer 6 is made of a plurality of coating rubber-covered carcass cords (not illustrated) disposed side by side with an angle with respect to the tire circumferential direction along the tire meridian direction at an angle with respect to the tire circumferential direction. The carcass cords are made of organic fibers such as polyester, rayon, nylon, and the like. The carcass layer 6 is provided with at least one layer.

The belt layer 7 has a multilayer structure in which at least two belts 7a, 7b are layered, in the tread portion 2, the outer circumference of the carcass layer 6 is arranged on the outer side in the tire radial direction, and the carcass layer 6 is covered in the tire circumferential direction. The belts 7a and 7b are formed by coating a plurality of cords (not illustrated) that are disposed side by side at a predetermined angle (for example, 20° to) 30° with respect to the tire circumferential direction with a rubber coating. The cord is made, for example, of steel or an organic fiber such as polyester, rayon, nylon or the like. The overlapping belts 7a and 7b are arranged so that the cords intersect with each other.

The belt reinforcing layer 8 is disposed on the outer side of the belt layer 7 in the tire radial direction, i.e. on the outer circumference thereof, and covers the belt layer 7 in the tire circumferential direction. The belt reinforcing layer 8 is formed by a plurality of rubber-coated cords (not illustrated) disposed substantially parallel to the tire circumferential direction and disposed side by side in the tire width direction. The cord is made of steel or an organic fiber such as polyester, rayon, nylon, or the like, and the cord angle is within a range of ±5° with respect to the tire circumferential direction. In the present embodiment, the belt reinforcing layer 8 is layered in two layers: a belt cover 8a disposed so as to cover the entire belt layer 7 in the tire width direction, and an edge cover 8b provided only on the outer side in the tire radial direction of the belt cover 8a near the end portion of the belt layer 7 in the tire width direction. The belt reinforcing layer 8 may have a configuration other than this, and may be composed of only the belt cover 8a disposed to cover the entire belt layer 7 or the edge cover 8b disposed to cover the end portion of the belt layer 7 in the tire width direction. The belt reinforcing layer 8 may be disposed so as to overlap at least the end portion in the tire width direction of the belt layer 7. The belt reinforcing layer 8 configured as described above is disposed by winding a band-like strip material having a width of about 10 mm in the tire circumferential direction.

The inner liner 9 is arranged along the carcass layer 6 on the inner side of the carcass layer 6 or on the inner side of the carcass layer 6 in the pneumatic tire 1.

Figure 2:
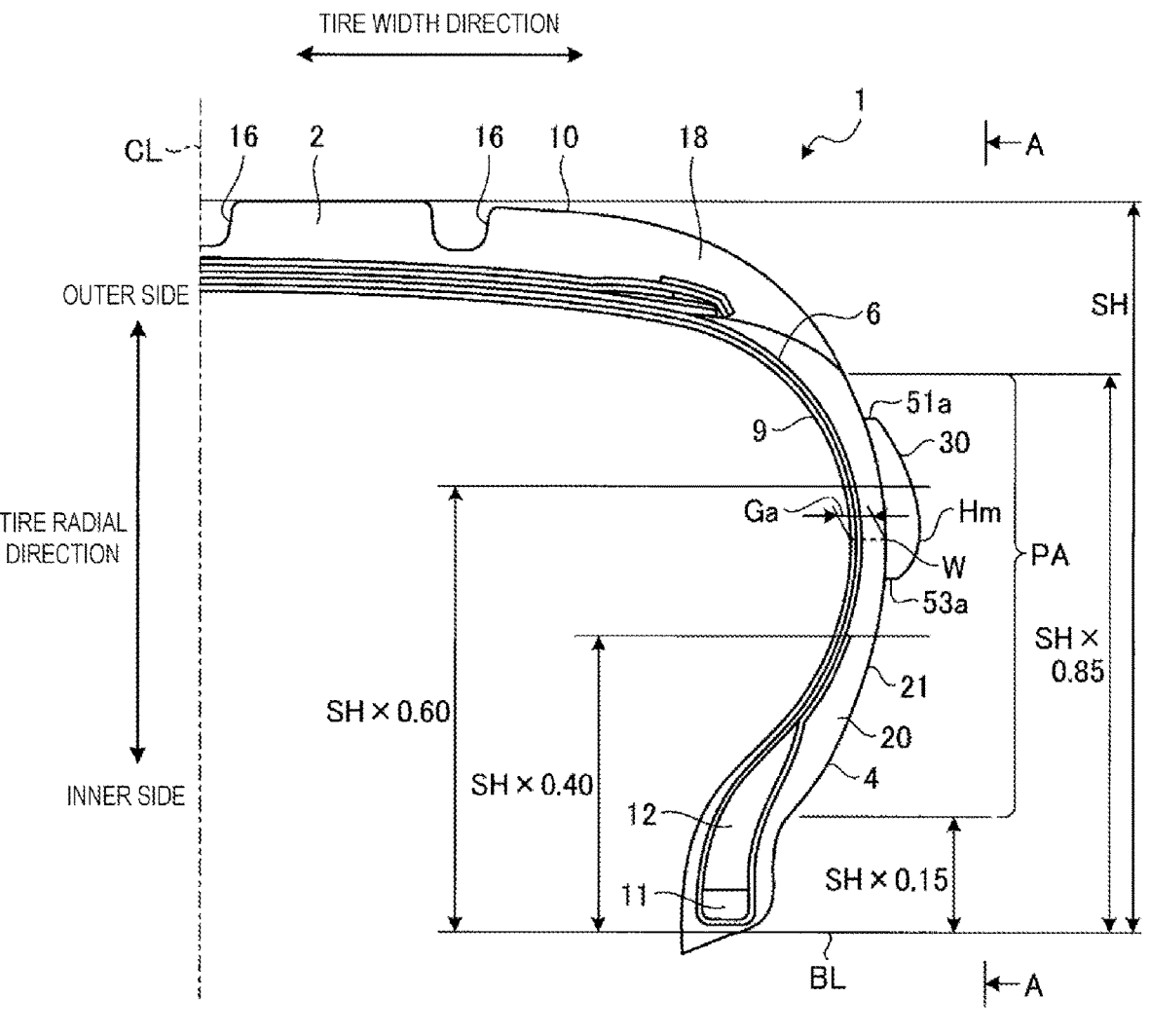
FIG. 2 is a detailed view of a tire side portion outside the vehicle mounting direction in the pneumatic tire illustrated in FIG. 1.

FIG. 2 is a detailed view of a tire side portion 20 outside the vehicle mounting direction in the pneumatic tire 1 illustrated in FIG. 1. In the pneumatic tire 1 according to this embodiment, a plurality of protrusion portions 30 are formed on the tire side surface 21 that is the surface of the tire side portion 20. The plurality of protrusion portions 30 are formed so as to respectively project from the tire side surface 21 and extend along the tire side surface 21. Of the tire side portions 20 located on both sides in the tire width direction, the protrusion portions 30 are formed on the tire side portion 20 on the outer side in the vehicle mounting direction. The protrusion portions 30 are protrusion portions that protrude from a reference surface excluding a pattern, characters, irregularities, and the like on the tire side surface 21.

Each of the plurality of protrusion portions 30 is disposed on the outer side in the tire radial direction in an arrangement possible region PA that is a region from a position of 15% to a position of 85% of the tire cross-sectional height SH from the rim diameter reference position BL, which is a reference position on the inner side in the tire radial direction of the tire cross-sectional height SH. The tire cross-section height SH here is the distance in the tire radial direction between the rim diameter reference position BL and the portion of the tread portion 2 that is located on the outermost side in the tire radial direction. The rim diameter reference position BL is a line in the tire axial direction that passes through the rim diameter defined by the JATMA standard.

In other words, the tire cross-sectional height SH is obtained by mounting the pneumatic tire 1 on a regular rim and filling the regular internal pressure, and is ½ of the difference between the tire outer diameter and the rim diameter when no load is applied to the pneumatic tire 1.

Here, a regular rim refers to a "standard rim" defined by the Japan Automobile Tire Manufacturers Association (JATMA), a "Design Rim" defined by the Tire and Rim Association (TRA), or a "Measuring Rim" defined by the European Tire and Rim Technical Organization (ETRTO). Moreover, the regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In addition, each of the plurality of protrusion portions 30 is formed so as to straddle the tire maximum width position W on the tire side surface 21 in the tire radial direction. The tire maximum width position W is the position in the tire radial direction at which the dimension in the tire width direction is a maximum, excluding structures such as patterns and characters protruding from the tire side surface 21 when the pneumatic tire 1 is mounted on a regular rim, is filled with regular internal pressure, and no load is applied to the pneumatic tire 1. Note that in a tire provided with a rim protect bar (which is provided along the tire circumferential direction and projects outward in the tire width direction) for protecting the rim, the position of the rim protect bar is the position where the dimension in the tire width direction is a maximum;

however, the tire maximum width position W defined in the present embodiment excludes the rim protect bar.

Furthermore, the tire side portions 20 disposed on both sides in the tire width direction have a thickness Ga at the tire maximum width position W within a range of no less than 2 mm and no more than 9 mm. In this case, the thickness Ga of the tire side portion 20 does not include the height of the protrusion portions 30. In other words, in the tire side portion 20, the distance from the tire side surface 21 at the tire maximum width position W to the tire inner surface is within a range of no less than 2 mm and no more than 9 mm. The thickness Ga of the tire side portion 20 at the tire maximum width position W is preferably in a range of no less than 2 mm and no more than 6 mm, and more preferably is within a range of no less than 2.5 mm and no more than 5 mm.

Figure 3:
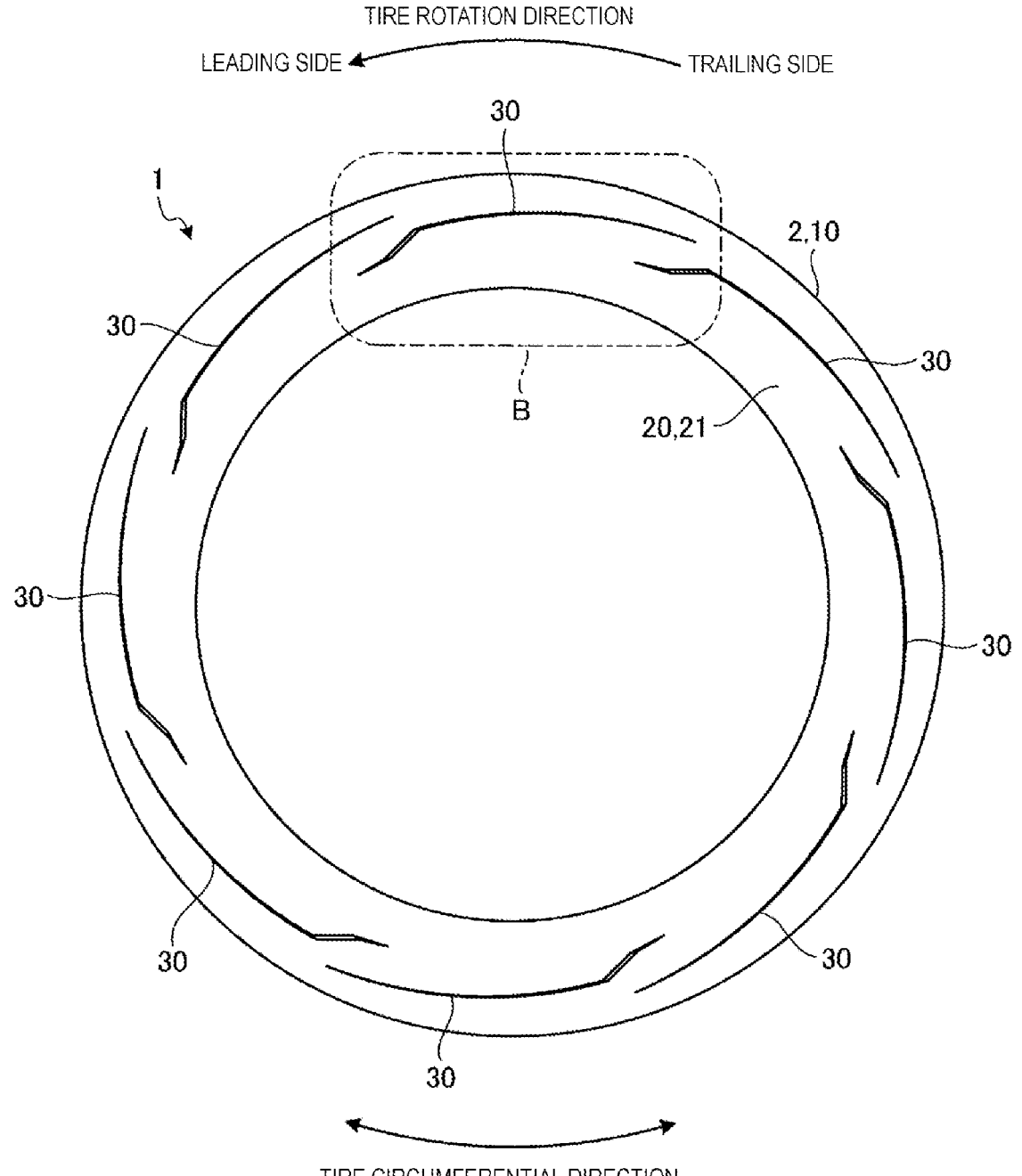
FIG. 3 is a view in the direction of arrow A-A in FIG. 2.

FIG. 3 is a view in the direction of arrow A-A in FIG. 2. The protrusion portions 30 are formed on one tire side portion 20 within a range of no less than 2 and no more than 16, and in the present embodiment, the protrusion portions 30 are formed at eight sections of one tire side portion 20. The eight protrusion portions 30 are discontinuously arranged at equal intervals in the tire circumferential direction. Moreover, the eight protrusion portions 30 are formed in substantially the same shape, and extend in the tire circumferential direction along the tire side surface 21 and are inclined in the tire radial direction with respect to the tire circumferential direction. Note that preferably the protrusion portions 30 formed on one tire side portion 20 are within a range of no less than 4 and no more than 12.

Figure 4:
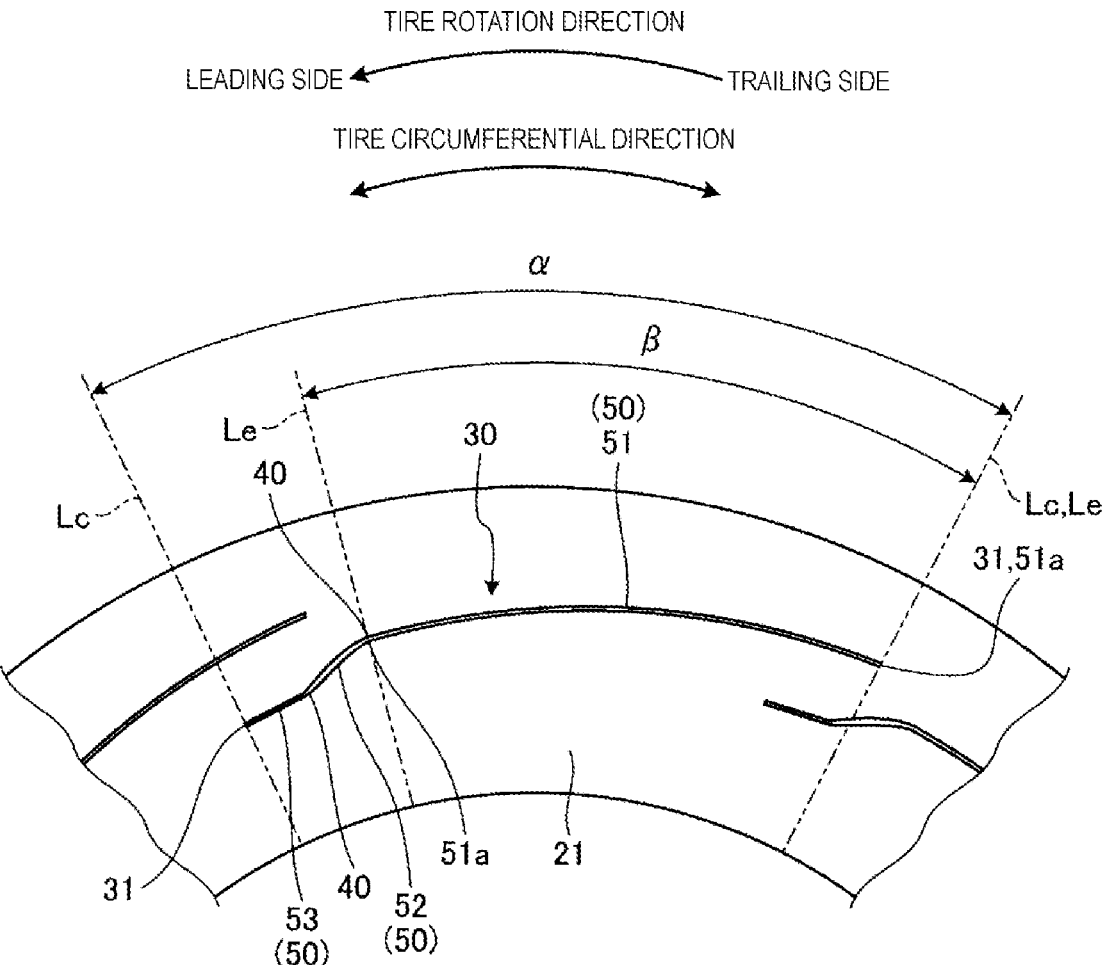
FIG. 4 is a detailed view of portion B of FIG. 3.

FIG. 4 is a detailed view of portion B of FIG. 3. The protrusion portions 30 extending in the tire circumferential direction are such that, a relative angle α in the tire circumferential direction between the two protrusion portion end position lines Lc that respectively extend in the tire radial direction through different end portions 31 of both end portions 31 in the extending direction of the protrusion portions 30, or in other words, an angle α formed by two protrusion portion end position lines Lc are within a range of no less than 6% and no more than 50% of the angle $2\pi$ of one round in the tire circumferential direction. In other words, each of the plurality of protrusion portions 30 disposed on one tire side portion 20 extends in the tire circumferential direction within a range where the angle α is no less than 6% and no more than 50% of the angle $2\pi$ of one round in the tire circumferential direction. The angle α defined in this way is an angle in the tire circumferential direction in the range in which one protrusion portion 30 is disposed, or in other words, is an extension angle of the protrusion portion 30 in the tire circumferential direction.

Note that in the protrusion portion 30, the angle α is preferably within a range of no less than 8% and no more than 40%, and more preferably is within a range of no less than 10% and no more than 30% the angle $2\pi$ of one round in the tire circumferential direction.

In addition, each protrusion portion 30 includes at least one bend portion 40 at a position where the extending direction of the protrusion portion 30 changes, and each protrusion portion 30 includes a plurality of bend portions 40. The number of bend portions 40 of one protrusion portion 30 is preferably within a range of no less than two and no more than four. Moreover, each protrusion portion 30 includes a plurality of extending portions 50 defined by the bend portions 40. In this case, the extending portions 50 are formed in a single arc shape or a single linear shape and each extends along the tire side surface 21. In addition, the single arc shape referred to here is a shape in which, when the extending portion 50 is formed curved, a difference in a relative ratio between the respective radii of curvature at the position with the largest radius of curvature and the position with the smallest radius of curvature is 10% or less. Furthermore, the single straight line shape is a shape in which the change in the extending direction of the extending portion 50 is 5° or less. Additionally, in a case where two extending portions 50 defined by a bend portion 40 are both in a single arc shape, the position of the inflection point is the bend portion 40, and in a case where the extending portions 50 are connected by an arc having a minimum radius of curvature, the bend portion 40 is a range in which an arc having a minimum radius of curvature is formed.

In the present embodiment, each protrusion portion 30 includes two bend portions 40 and three extending portions 50 defined by the two bend portions 40. In other words, each protrusion portion 30 includes three extending portions 50: a first extending portion 51, a second extending portion 52, and a third extending portion 53. Of these, the first extending portion 51 is the extending portion 50 having the longest length among the plurality of extending portions 50 of the single protrusion portion 30. The second extending portion 52 is an extending portion 50 continuous from the first extending portion 51 via the bend portion 40. Moreover, the third extending portion 53 is located on the opposite side to the side where the first extending portion 51 is located in the extending direction of the second extending portion 52, and is an extending portion 50 that is continuous from the second extending portion 52 via the bend portion 40. In other words, of the plurality of extending portions 50, only one end portion of the first extending portion 51 and the third extending portion 53 is defined by a bend portion 40 in the extending direction of the first extending portion 51 and the third extending portion 53, and both end portions of the second extending portion 52 in the extending direction of the second extending portion 52 are defined by a bend portion 40.

Moreover, the first extending portion 51 is disposed on the outermost side in the tire radial direction among the plurality of extending portions 50, and the protrusion portion 30 is inclined with respect to the tire circumferential direction in a direction from the outer side in the tire radial direction toward the inner side in the tire radial direction while going from the first extending portion 51 side toward the third extending portion 53 side. Therefore, the second extending portion 52 is disposed further on the inner side in the tire radial direction than the first extending portion 51, and the third extending portion 53 is disposed further on the inner side in the tire radial direction than the second extending portion 52.

The plurality of protrusion portions 30 formed on one tire side portion 20 are such that the inclination directions in the tire radial direction when going in a predetermined direction in the tire circumferential direction are all in the same direction (see FIG. 3). Therefore, the plurality of first extending portions 51 included in the plurality of protrusion portions 30 also have the same direction of inclination in the tire radial direction with respect to the tire circumferential direction. More specifically, the first extending portion 51 inclines with respect to the tire circumferential direction in a direction from the inner side to the outer side in the tire radial direction while going from the leading side to the trailing side in the rotation direction of the pneumatic tire 1.

Moreover, similarly, the second extending portion 52 and the third extending portion 53 are also inclined with respect to the tire circumferential direction in a direction from the inner side to the outer side in the tire radial direction while going from the leading side to the trailing side in the rotation direction of the pneumatic tire 1.

In addition, of the plurality of extending portions 50 included in the protrusion portion 30, the second extending portion 52 is such that the inclination in the tire radial direction with respect to the tire circumferential direction is larger than the inclination of the first extending portion 51 in the tire radial direction with respect to the tire circumferential direction. Furthermore, the second extending portion 52 has a greater inclination in the tire radial direction with respect to the tire circumferential direction than the third extending portion 53. In other words, the first extending portion 51, the second extending portion 52, and the third extending portion 53 all have the same inclination direction in the tire radial direction when going in a predetermined direction in the tire circumferential direction, while the inclination in the tire radial direction with respect to the tire circumferential direction is greatest in the second extending portion 52.

In addition, the first extending portion 51 having the longest length among the plurality of extending portions 50 is such that the length C1 (see FIG. 7) thereof is within a range of no less than 1.0 and no more than 6.0 times the height FH (see FIG. 6) of the arrangement possible region PA in the tire radial direction. In other words, the first extending portion 51 has a length C1 within a range of no more than 1.0 times and no less than 6.0 times 70% of the tire cross-sectional height SH. Note that the length C1 of the first extending portion 51 is preferably within a range of no less than 1.5 and no more than 5.0 times the height FH of the arrangement possible region PA in the tire radial direction.

Moreover, the first extending portion 51 is such that, of both end portions 51a in the extending direction of the first extending portion 51, a relative angle β in the tire circumferential direction between the two first extending portion end position lines Le extending in the tire radial direction through the different end portions 51a, or in other words, the angle β formed by the two first extending portion end position lines Le is formed to be within the range 0.60≤(β/α)≤0.90 with respect to the angle α. This angle β is an angle in the tire circumferential direction in the range in which one first extending portion 51 is disposed, or in other words, is an extension angle of the first extending portion 51 in the tire circumferential direction.

Note that the angle β of the first extending portion 51 with respect to the angle α of the protrusion portion 30 is preferably within the range 0.70≤(β/α)≤0.85.

Figure 7:
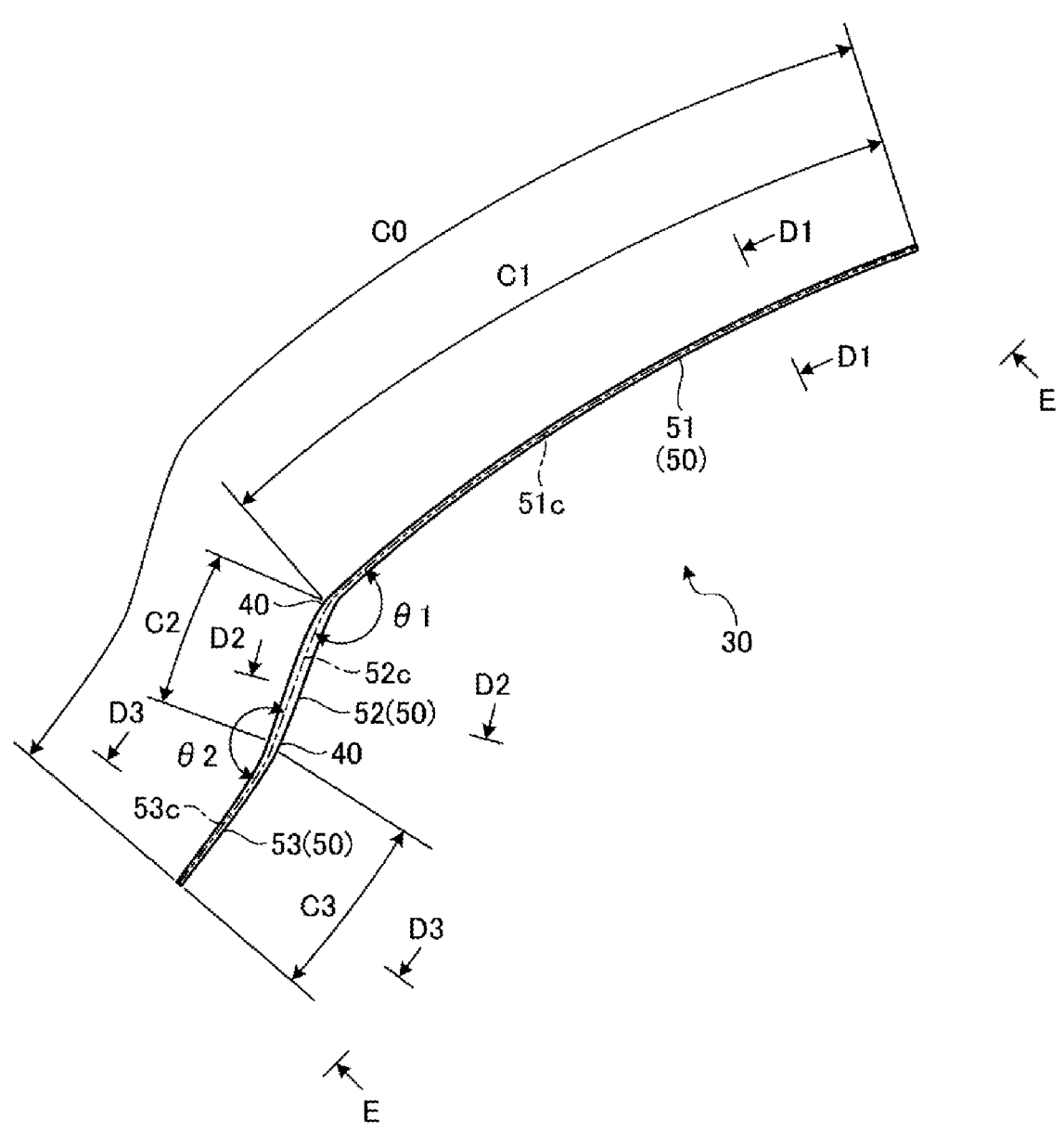
FIG. 7 is a detailed view of the protrusion portion illustrated in FIG. 5.

The first extending portion 51 formed in this manner has a length C1 (see FIG. 7) within a range of no less than 1.5 and no more than 30 times the length C2 of the second extending portion 52 (see FIG. 7). Furthermore, the length C1 of the first extending portion 51 is within a range of no less than 1.2 and no more than 25 times the length C3 (see FIG. 7) of the third extending portion 53, which is the extending portion 50 other than the second extending portion 52 and the first extending portion 51. Note that the length C1 of the first extending portion 51 is preferably within a range of no less than 3 and no more than 20 times the length C2 of the second extending portion 52, and more preferably is within a range of no less than 5 no more than 15 times the length of C2. The length C1 of the first extending portion 51 is preferably within a range of no less than 2 and no more than 20 times the length C3 of the third extending portion 53, and more preferably is within a range of no less than 3 and no more than 15 times the length C3.

Figure 5:
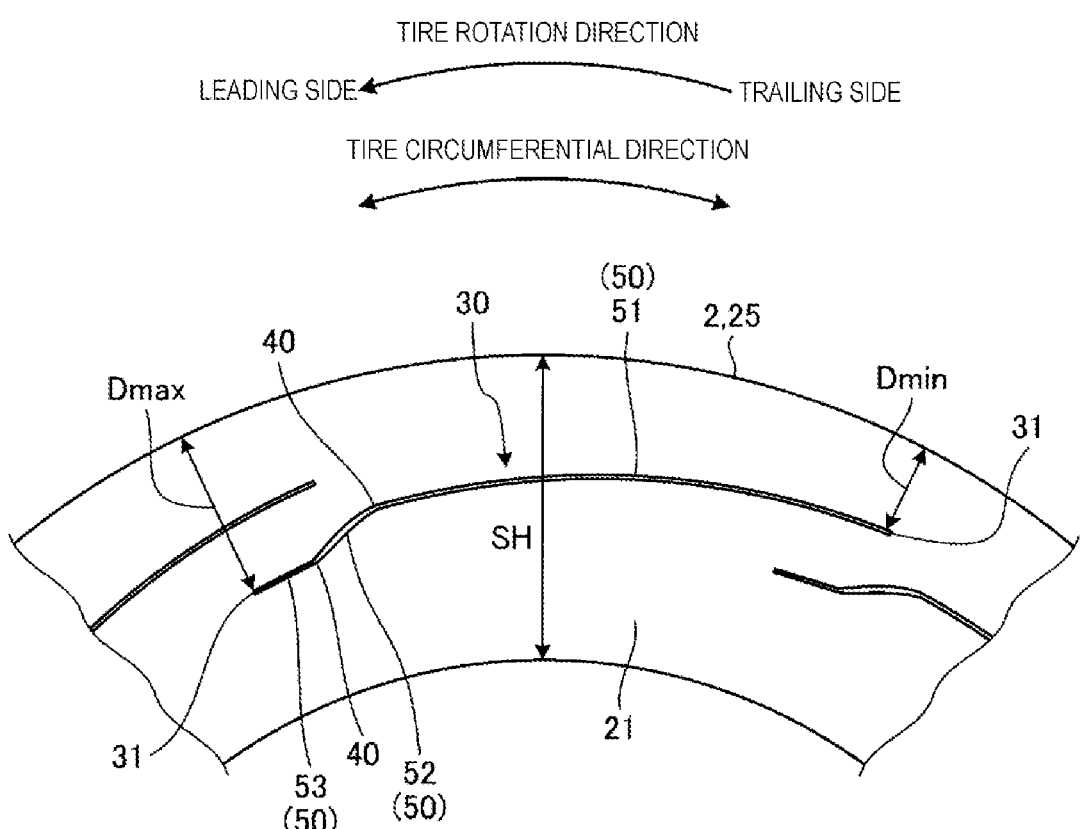
FIG. 5 is a detailed view of portion B of FIG. 3, and is an explanatory diagram of the position at which a protrusion portion is disposed.

FIG. 5 is a detailed view of portion B of FIG. 3, and is an explanatory diagram of the position at which the protrusion portion 30 is disposed. The protrusion portion 30 formed to be inclined in the tire radial direction with respect to the tire circumferential direction is such that the relationship between the distance Dmax in the tire radial direction between the tire outer diameter portion 25 and the innermost portion of the protrusion portion 30 in the tire radial direction and the distance Dmin in the tire radial direction between the outermost portion of the protrusion portion 30 in the tire radial direction and the tire outer diameter portion 25 is within the range 1.2≤(Dmax/Dmin)≤3.5. The tire outer diameter portion 25 in this case is a portion that becomes the outer diameter of the pneumatic tire 1, or in other words, is a portion that is located on the outermost side in the tire radial direction in the tread portion 2.

Moreover, the distance Dmax is within a range of no less than 0.30 and no more than 0.70 times the tire cross-sectional height SH.

Note that preferably the protrusion portion 30 is such that the relationship between the distance Dmax and the distance Dmin is within the range 1.5≤(Dmax/Dmin)≤2.5. Furthermore, the distance Dmax is preferably within a range of no less than 0.35 and no more than 0.65 times the tire cross-sectional height SH, and more preferably is within a range of no less than 0.40 and no more than 0.60 times the tire cross-sectional height SH.

More specifically, the protrusion portion 30 is inclined with respect to the tire circumferential direction in a direction from the outer side in the tire radial direction to the inner side in the tire radial direction while going from the first extending portion 51 side to the third extending portion 53 side, so of the protrusion portion 30, the portion located on the innermost side in the tire radial direction is the end portion 31 on the third extending portion 53 side of both end portions 31 in the extending direction of the protrusion portion 30. Therefore, the distance Dmax is a distance in the tire radial direction between the end portion 31 on the third extending portion 53 side of the protrusion portion 30 and the tire outer diameter portion 25. Additionally, a portion of the protrusion portion 30 located on the outermost side in the tire radial direction is the end portion 31 on the first extending portion 51 side of both end portions 31 in the extending direction of the protrusion portion 30. Therefore, the distance Dmin is a distance in the tire radial direction between the end portion 31 on the first extending portion 51 side of the protrusion portion 30 and the tire outer diameter portion 25.

Figure 6:
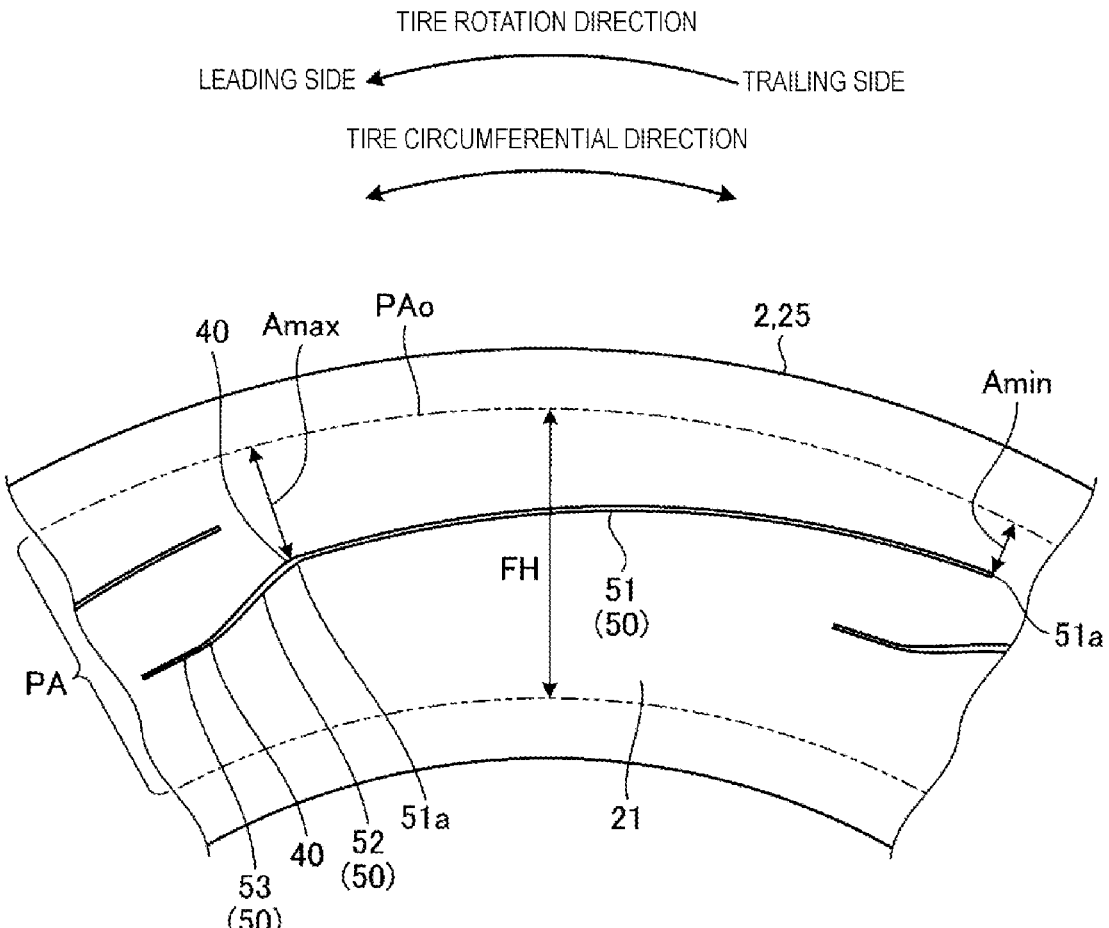
FIG. 6 is a detailed view of portion B of FIG. 3, and is an explanatory diagram of the position where the protrusion portion is disposed with respect to an arrangement possible region.

FIG. 6 is a detailed view of portion B of FIG. 3, and is an explanatory diagram of the position where the protrusion portion 30 is disposed with respect to the arrangement possible region PA. Furthermore, the first extending portion 51 is such that the relationship between the distance Amax in the tire radial direction between the innermost portion of the first extending portion 51 in the tire radial direction and the outer diameter portion PAo of the arrangement possible region PA and the distance Amin in the tire radial direction between the outermost portion of the first extending portion 51 in the tire radial direction and the outer diameter portion PAo of the arrangement possible region PA is within the range 1.0≤(Amax/Amin)≤3.5. The outer diameter portion PAo of the arrangement possible region PA in this case is a position that defines the outer end of the arrangement possible region PA in the tire radial direction, or in other words, is a position at 85% of the tire cross-sectional height SH from the rim diameter reference position BL to the outer side in the tire radial direction (see FIG. 2). Furthermore, the distance Amin is such that the relationship with the height FH of the arrangement possible region PA in the tire radial direction within a range 0≤Amin≤(FH×0.3).

More specifically, the first extending portion 51 is inclined with respect to the tire circumferential direction in a direction from the outer side in the tire radial direction to the inner side in the tire radial direction while going from the side of the end portion 51a opposite to the side where the second extending portion 52 is located, toward the side where the second extending portion 52 is located, so of the first extending portion 51, the portion located on the innermost side in the tire radial direction is the end portion 51a on the second extending portion 52 side of both end portions 51a in the extending direction of the first extending portion 51. Therefore, the distance Amax is the distance in the tire radial direction between the end portion 51a of the first extending portion 51 on the second extending portion 52 side and the outer diameter portion PAo of the arrangement possible region PA, and in the first extending portion 51, is the distance at a position where the distance in the tire radial direction from the outer diameter portion PAo of the arrangement possible region PA is the largest. In other words, the first extending portion 51 is such that the portion where the bend portion 40 that defines the first extending portion 51 and the second extending portion 52 is located, is located at a position in the first extending portion 51 where the distance in the tire radial direction from the outer diameter portion PAo of the arrangement possible region PA is the largest.

Moreover, a portion of the first extending portion 51 located on the outermost side in the tire radial direction is the end portion 51a of both end portions 51a in the extending direction of the first extending portion 51 on the opposite side of the side where the second extending portion 52 is located. Therefore, the distance Amin is the distance in the tire radial direction between the end portion 51a of the protrusion portion 30 on the side opposite to the side where the second extending portion 52 is located and the outer diameter portion PAo of the arrangement possible region PA, and in the first extending portion 51, is the distance at a position where the distance in the tire radial direction from the outer diameter portion PAo of the arrangement possible region PA is the smallest.

Note that the first extending portion 51 is such that the relationship between the distance Amax and the distance Amin is preferably within the range 1.0≤(Amax/Amin)≤2.0. Moreover, the distance Amin is such that preferably the relationship between the arrangement possible region PA and the height FH in the tire radial direction is within the range 0≤Amin≤(FH×0.2).

FIG. 7 is a detailed view of the protrusion portion 30 illustrated in FIG. 5. The protrusion portion 30 is such that the length C0 along the shape of the protrusion portion 30, or in other words, the length C0 of the protrusion portion 30 along the extending direction is within a range of no less than 1.5 and no more than 7.0 times the height FH (see FIG. 6) of the arrangement possible region PA in the tire radial direction. Note that the length C0 of the protrusion portion 30 is preferably within a range of no less than 2.0 and no more than 6.0 times the height FH of the arrangement possible region PA in the tire radial direction, and even more preferably is within a range of no less than 2.5 and no more than 5.5 times the height FH.

Furthermore, the protrusion portion 30 is such that the first extending portion 51 is the longest extending portion 50 among the plurality of extending portions 50 included in the protrusion portion 30, so the first extending portion 51 has a length C1 along the shape of the first extending portion 51 that is longer than the second extending portion 52 and the third extending portion 53. In other words, the length C1 of the first extending portion 51 is longer than the length C2 of the second extending portion 52 along the shape of the second extending portion 52, or the length C3 of the third extending portion 53 along the shape of the third extending portion 53.

Moreover, the protrusion portion 30 is such that an angle θ1 formed by a center line 51c in the width direction of the first extending portion 51 and a center line 52c in the width direction of the second extending portion 52 is within the range 90°≤θ1≤170°. In addition, the protrusion portion 30 is such that the angle θ2 formed by the center line 52c in the width direction of the second extending portion 52 and the center line 53c in the width direction of the third extending portion 53 is also within the range 90°≤θ2≤170°. In other words, the protrusion portion 30 including a plurality of extending portions 50 defined by bend portions 40 is such that the angle θn formed by the center lines of the two extending portions 50 that are continuous through the bend portion 40 in the respective width directions is within the range 90°≤θn≤170°. Note that these angles θ1 and θ2, or in other words, the angle θn, are preferably in a range of no less than 110° and no more than 160°.

Figure 8:
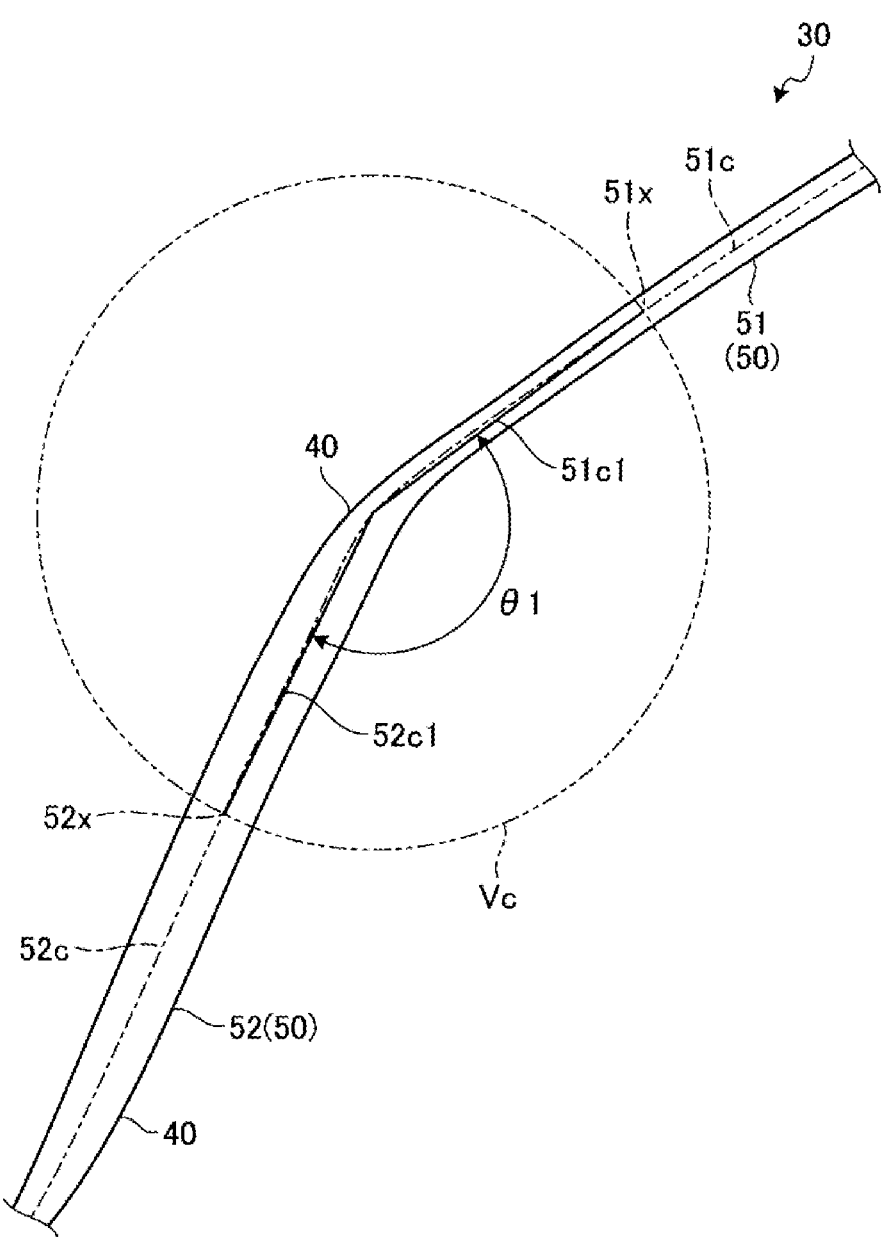
FIG. 8 is an explanatory diagram of the angle θ1 formed by the center line of a first extending portion and the center line of a second extending portion illustrated in FIG. 7.

FIG. 8 is an explanatory diagram of the angle θ1 formed by the center line 51c of the first extending portion 51 and the center line 52c of a second extending portion 52 illustrated in FIG. 7. Here, the extending portion 50 is formed in a single arc shape or a single straight line shape, so the first extending portion 51, the second extending portion 52, and the third extending portion 53 may also be formed in a single arc shape. In a case where the extending portion 50 is formed in an arc shape, the angle θn that is formed by the center lines of the two extending portions 50 that are continuous via the bend portion 40 is an angle between imaginary lines connecting the bend portion 40 and a position where a circle having a predetermined radius whose center is located in the bend portion 40 and the center line of each extending portion

50 intersect, and for convenience, the angle θn is the angle that is formed by the center lines of the two extending portions 50.

For example, the angle θ1 formed by the center line 51c of the first extending portion 51 and the center line 52c of the second extending portion 52 in a case where at least one of the first extending portion 51 and the second extending portion 52 is formed in a single arc shape is defined by a position where a circle having a predetermined radius centered on the bend portion 40 and the center line 51c of the first extending portion 51 and the center line 52c of the second extending portion 52 intersect with each other, and for convenience sake, the angle between the imaginary lines connecting each of the portions 40 will be referred to as the angle θ1.

More specifically, of the first extending portion 51 and the second extending portion 52, an imaginary circle Vc having a radius that is half the length of the second extending portion 52 that is the extending portion 50 on the shorter side is set so that the center is located at the bend portion 40, and a line connecting the bend portion 40 and the intersection 51x of the center line 51c of the first extending portion 51 and the imaginary circle Vc is defined as a temporary center line 51c1 of the first extending portion 51. Similarly, a line connecting an intersection portion 52x of the center line 52c of the second extending portion 52 and the imaginary circle Vc and the bend portion 40 is defined as a temporary center line 52c1 of the second extending portion 52. The angle formed by the temporary center line 51c1 of the first extending portion 51 and the temporary center line 52c1 of the second extending portion 52 set as described above may be taken to be an angle θ1 that is formed by the center line 51c in the width direction of the first extending portion 51 and the center line 52c of the second extending portion 52 in the width direction.

The first extending portion 51 and the second extending portion 52 are such that the angle θ1 set in this manner is within the range 90°≤θ1≤170°.

The angle θ2 formed by the center line 52c of the second extending portion 52 in the width direction and the center line 53c of the third extending portion 53 in the width direction may be derived by the same method.

The second extending portion 52 is such that the inclination in the tire radial direction with respect to the tire circumferential direction is larger than the inclination of the first extending portion 51 and the third extending portion 53 in the tire radial direction with respect to the tire circumferential direction; however, the inclination of the first extending portion 51, the second extending portion 52, and the third extending portion 53 in the tire radial direction with respect to the tire circumferential direction may also be derived based on a circle having a radius of a predetermined size with the bend portion 40 as the center.

Figure 9:
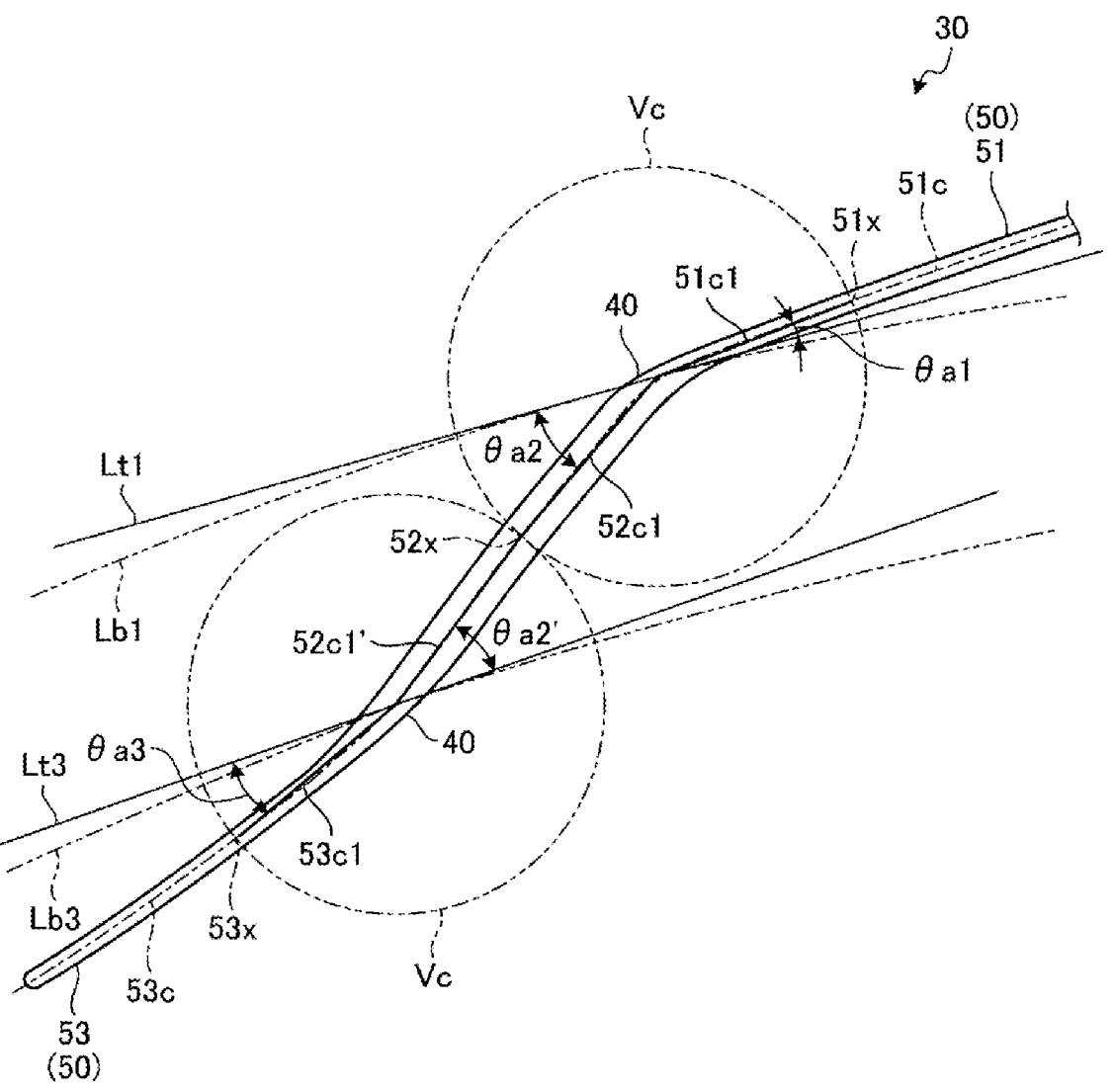
FIG. 9 is an explanatory diagram of a comparison of the inclination of an extending portion illustrated in FIG. 7.

FIG. 9 is an explanatory diagram of a comparison of the inclination of an extending portion 50 illustrated in FIG. 7. For example, when comparing the inclinations of the first extending portion 51 and the second extending portion 52 in the tire radial direction with respect to the tire circumferential direction, as in the method of obtaining the angle θ1 formed by the center line 51c of the first extending portion 51 and the center line 52c of the second extending portion 52, the temporary center line 51c1 of the first extending portion 51 and the temporary center line 52c1 of the second extending portion 52 are set using the imaginary circle Vc. In addition, a reference circle Lb1 whose center is located on the tire rotation axis and that passes through the center of the imaginary circle Vc, or in other words, the connecting portion between the temporary center line $51c1$ of the first extending portion 51 and the temporary center line $52c1$ of the second extending portion 52 is set, and a tangent line Lt1 of the reference circle Lb1 passing through the center of the imaginary circle Vc is set. The second extending portion 52 is such that the angle $\theta a2$ between the temporary center line $52c1$ and the tangent line Lt1 set as described above is greater than the angle $\theta a1$ between the temporary center line $51c1$ and the tangent line Lt1 of the first extending portion 51. Therefore, the second extending portion 52 is such that the inclination in the tire radial direction with respect to the tire circumferential direction is larger than the inclination of the first extending portion 51 in the tire radial direction with respect to the tire circumferential direction.

When comparing the inclinations of the second extending portion 52 and the third extending portion 53 in the tire radial direction with respect to the tire circumferential direction, of the second extending portion 52 and the third extending portion 53, the imaginary circle Vc having a radius that is half the length of the second extending portion 52 that is the extending portion 50 on the shorter side is set so that the center is positioned in the bend portion 40 that defines the second extending portion 52 and the third extending portion 53, and a line connecting the intersection portion $52x$ of the center line $52c$ of the second extending portion 52 and the imaginary circle Vc and the bend portion 40 is defined as a temporary center line $52c1'$ of the second extending portion 52. Similarly, a line connecting the intersection $53x$ of the center line $53c$ of the third extending portion 53 and the imaginary circle Vc and the bend portion 40 is defined as a temporary center line $53c1$ of the third extending portion 53.

In addition, a reference circle Lb3 whose center is located on the tire rotation axis and that passes through the center of the imaginary circle Vc, or in other words, the connecting portion between the temporary center line $52c1'$ of the second extending portion 52 and the temporary center line $53c1$ of the third extending portion 53 is set, and a tangent line Lt3 of the reference circle Lb3 passing through the center of the imaginary circle Vc is set. The second extending portion 52 is such that the angle $\theta a2'$ between the temporary center line $52c1$ and the tangent line Lt3 set as described above is larger than the angle $\theta a3$ between the temporary center line $53c1$ and the tangent line Lt3 of the third extending portion 53. Therefore, the second extending portion 52 is such that the inclination in the tire radial direction with respect to the tire circumferential direction is larger than the inclination of the third extending portion 53 in the tire radial direction with respect to the tire circumferential direction. In other words, the second extending portion 52 is such that the inclination in the tire radial direction with respect to the tire circumferential direction is larger than the inclination of the first extending portion 51 and the third extending portion 53 in the tire radial direction with respect to the tire circumferential direction.

Figure 10A:
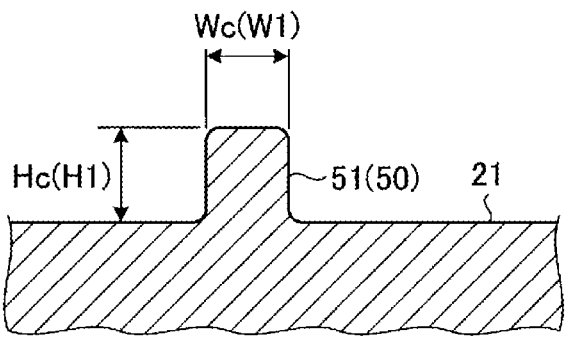
FIG. 10A is a cross-sectional view of D1-D1 of FIG. 7.
Figure 10B:
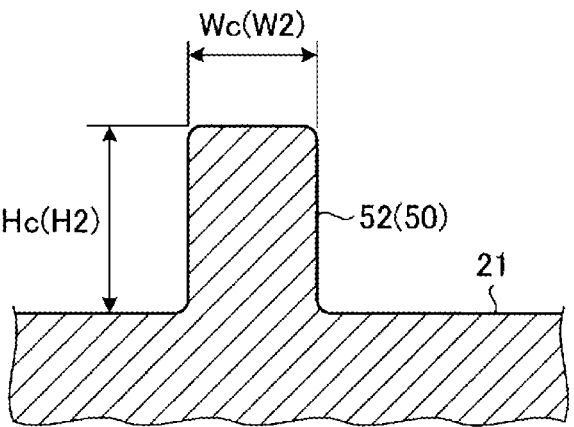
FIG. 10B is a cross-sectional view of D2-D2 of FIG. 7.
Figure 10C:
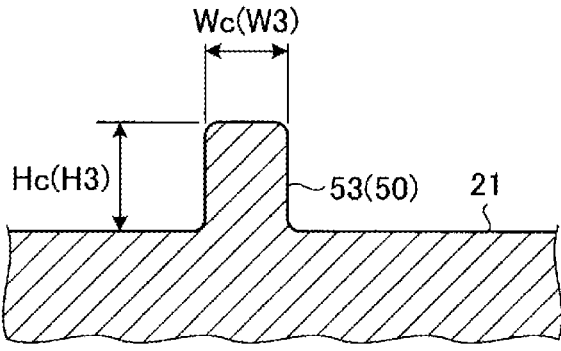
FIG. 10C is a cross-sectional view of D3-D3 of FIG. 7.

FIG. 10A is a cross-sectional view of D1-D1 of FIG. 7. FIG. 10B is a cross-sectional view of D2-D2 of FIG. 7. FIG. 10C is a cross-sectional view of D3-D3 of FIG. 7. The protrusion portion 30 is formed such that the cross-sectional shape when viewed in the extending direction of the protrusion portion 30 is a substantially rectangular shape in which the height direction of the protrusion portion 30 is the longitudinal direction. Moreover, each of the plurality of extending portions 50 included in the protrusion portion 30 has the width Wc and the height Hc that change at a position where crossing the bend portion 40. The width Wc of the extending portion 50 in this case is the width of the extending portion 50 in the direction orthogonal to the extending direction of the extending portion 50 in a case of viewing the extending portion 50 in the direction in which the protrusion portion 30 projects from the tire side surface 21. Furthermore, the height Hc of the extending portion 50 is the height from the tire side surface 21.

The plurality of extending portions 50 have different widths Wc and heights Hc defined in this way for each extending portion 50. In other words, in the protrusion portion 30, the first extending portion 51, the second extending portion 52, and the third extending portion 53 have different widths Wc and heights Hc. In the present embodiment, the width W2 of the second extending portion 52 is such that the average width is larger than the average width of each of the width W1 of the first extending portion 51 and the width W3 of the third extending portion 53. In addition, the height H2 of the second extending portion 52 is also such that the average height is higher than the average height of each of the height H1 of the first extending portion 51 and the height H3 of the third extending portion 53.

Figure 11:
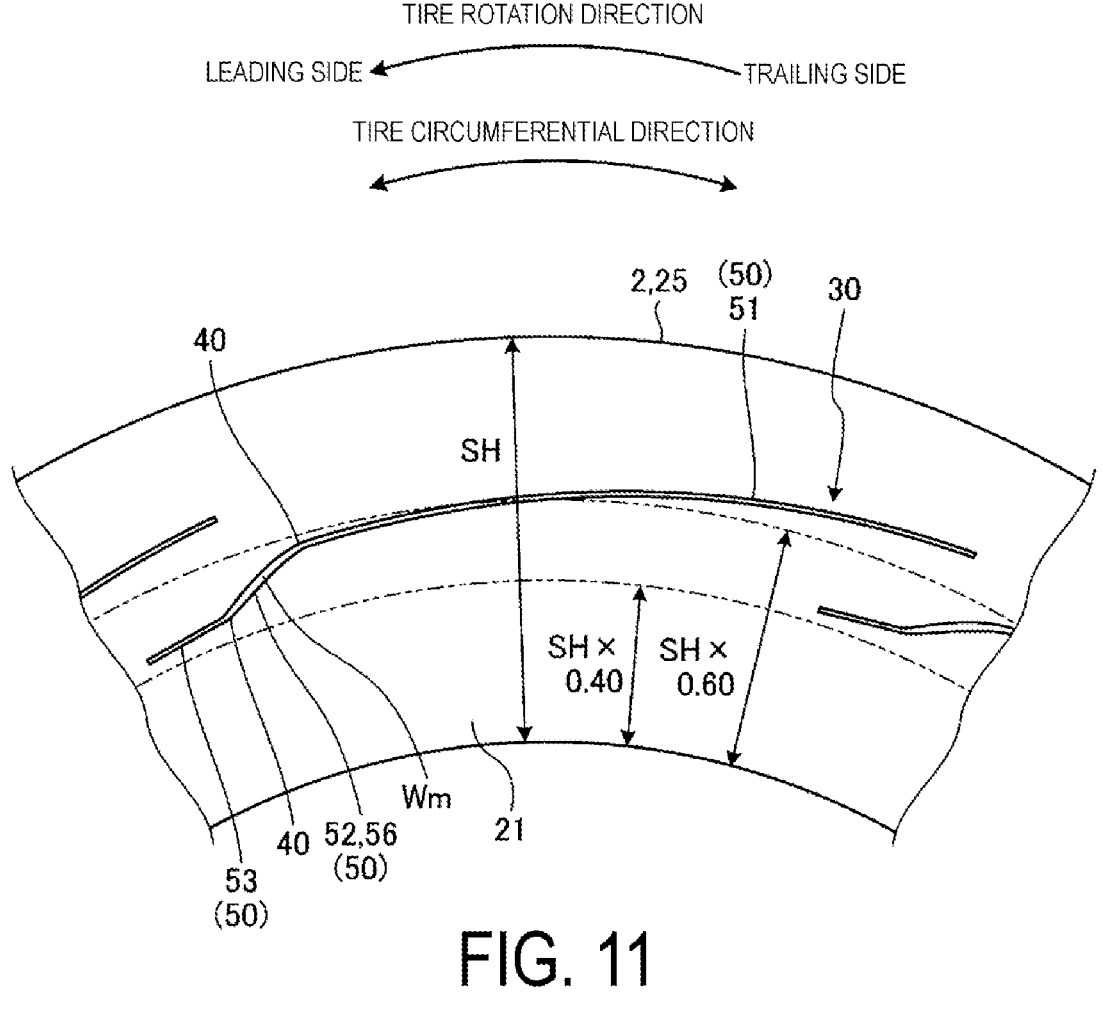
FIG. 11 is an explanatory diagram of the position of the maximum width portion Wm of the protrusion portion.

FIG. 11 is an explanatory diagram of the position of the maximum width portion Wm of the protrusion portion 30. The plurality of extending portions 50 are such that in one extending portion 50, the width Wc is within a range of no less than 0.1 and no more than 1.0 times the maximum width of the extending portion 50. Moreover, of the plurality of extending portions 50, the first extending portion 51 that is the extending portion 50 having the longest length is such that the maximum width is within a range of no less than 0.5 mm and no more than 7.0 mm. Furthermore, the second extending portion 52 is such that the maximum width is larger than the maximum width of the first extending portion 51, or more specifically, the second extending portion is such that the maximum width is within a range of no less than 1.5 and no more than 5 times the maximum width of the first extending portion 51.

Additionally, the second extending portion 52 is such that even with respect to the third extending portion 53, the maximum width is larger than the maximum width of the third extending portion 53. Therefore, the protrusion portion 30 is such that the maximum width portion Wm, which is the portion having the maximum width in the protrusion portion 30, is located in the second extending portion 52. The protrusion portion 30 is such that the position in the tire radial direction of the maximum width portion Wm of the protrusion portion 30 located in the second extending portion 52 in this way is included within a range of no less than 0.40 and no more than 0.60 times the tire cross-sectional height SH from the rim diameter reference position BL to the outer side in the tire radial direction. Note that the position of the maximum width portion Wm of the protrusion portion 30 in the tire radial direction is preferably included within a range of no less than 0.45 and no more than 0.55 times the tire cross-sectional height SH from the rim diameter reference position BL to the outer side in the tire radial direction.

Figure 12:
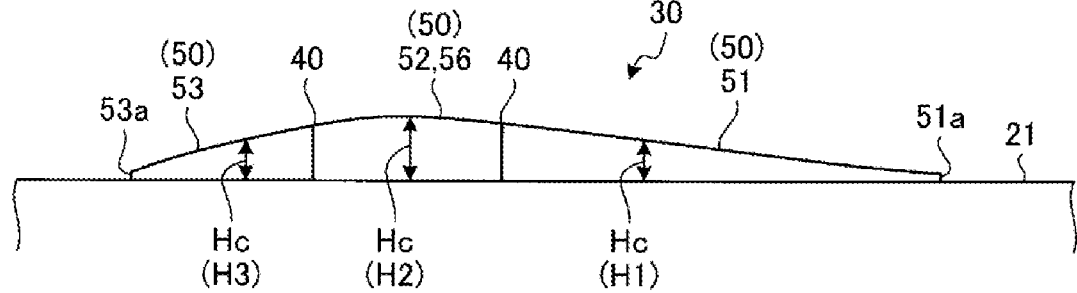
FIG. 12 is a schematic diagram of the protrusion portion illustrated in FIG. 7 as viewed in the E-E direction.

FIG. 12 is a schematic diagram of the protrusion portion 30 illustrated in FIG. 7 as viewed in the E-E direction. The protrusion portion 30 is such that The height Hc is different for each extending portion 50, so in other words, the height Hc from the tire side surface 21 differs depending on the position of the protrusion portion 30, and the height Hc from the tire side surface 21 and the way the height Hc changes are different for each extending portion 50. For example, the first extending portion 51 is such that the height H1 from the tire side surface 21 decreases going from the side on which the second extending portion 52 is located toward the end portion 51a located on the opposite side to the side on which the second extending portion 52 is located. The first extending portion 51 formed in this manner is arranged further on the outer side in the tire radial direction than the second extending portion 52 and is inclined in the tire radial direction with respect to the tire circumferential direction, so the first extending portion 51 is such that the height H1 from the tire side surface 21 decreases going toward the outer side in the tire radial direction, and the height H1 from the tire side surface 21 becomes lowest at the position of the end portion 51a on the outer side in the tire radial direction (see FIG. 2). In other words, the first extending portion 51 is such that the height H1 from the tire side surface 21 is the lowest at the position where the distance in the tire radial direction between the arrangement possible region PA and the outer diameter portion PAo is the smallest distance Amin (see FIG. 6).

Moreover, similar to the first extending portion 51, the third extending portion 53 also is such that the height H3 from the tire side surface 21 decreases from the side where the second extending portion 52 is located to the end portion 53a which is located on the opposite side to the side where the second extending portion 52 is located (see FIG. 12). The third extending portion 53 formed in this manner is disposed on the inner side in the tire radial direction with respect to the second extending portion 52 and is inclined in the tire radial direction with respect to the tire circumferential direction, so the third extending portion 53 is such that the height H3 from the tire side surface 21 decreases going toward the inner side in the tire radial direction, and the height H3 from the tire side surface 21 becomes lowest at the position of the end portion 53a on the inner side in the tire radial direction (see FIG. 2).

In addition, of the plurality of extending portions 50, the highest extending portion 56, which is the extending portion 50 having the highest average extending portion height that is the average height from the tire side surface 21 for each extending portion 50, is one of the extending portions 50 other than the first extending portion 51.

In the present embodiment, the highest extending portion 56 becomes the second extending portion 52, which is the extending portion 50 of the plurality of extending portions 50 that is continuous from the first extending portion 51 via the bend portion 40. Therefore, the highest extending portion 56 is the extending portion 50 of the plurality of extending portions 50 having the largest inclination in the tire radial direction with respect to the tire circumferential direction. The second extending portion 52, which is the highest extending portion 56, has an average extending portion height within a range of no less than 3 mm and no more than 10 mm.

In addition, of the plurality of extending portions 50, the extending portion 50 other than the highest extending portion 56 has an average extending portion height that is within a range of no less than 0.1 and no more than 0.8 times an average extending portion height of the highest extending portion 56.

In other words, the first extending portion 51 and the third extending portion 53, which are the extending portions 50 other than the highest extending portion 56, have an average extending portion height that is within a range of no less than 0.1 and no more than 0.8 times an average extending portion height of the second extending portion 52, which is the highest extending portion 56.

Moreover, the position in the tire radial direction of the maximum height portion Hm, which is the portion where the height H2 of the second extending portion 52 that is the highest extending portion 56 from the tire side surface 21 is the highest, is included within the range from the rim diameter reference position BL to the outer side in the tire radial direction from a position where the height is 0.40 times to 0.60 times the tire cross-sectional height SH (see FIG. 2). In other words, the protrusion portion 30 is such that the position in the tire radial direction of the maximum height portion Hm, which is the portion where the height from the tire side surface 21 is the highest, is included within the range from the rim diameter reference position BL to the outer side in the tire radial direction from a position where the height is no less than 0.40 and no more than 0.60 times the tire cross-sectional height SH. Note that the position of the maximum height portion Hm of the protrusion portion 30 in the tire radial direction is preferably included within the range from the rim diameter reference position BL to the outer side in the tire radial direction from a position where the height is no less than 0.45 and no more than 0.55 times the tire cross-sectional height SH.

In addition, the maximum height of the second extending portion 52 from the tire side surface 21 is within a range of no less than 1.1 times and no more than 3.0 times the maximum width of the second extending portion 52. In other words, in the second extending portion 52 is such that the height Hc at the maximum height portion Hm is in a range of no less than 1.1 and no more than 3.0 times the width Wc at the maximum width portion Wm (see FIG. 11) of the second extending portion 52. On the other hand, the first extending portion 51 is such that the maximum height from the tire side surface 21 is in a range of no less than 1.1 and no more than 5.0 times the maximum width of the first extending portion 51.

Figure 13:
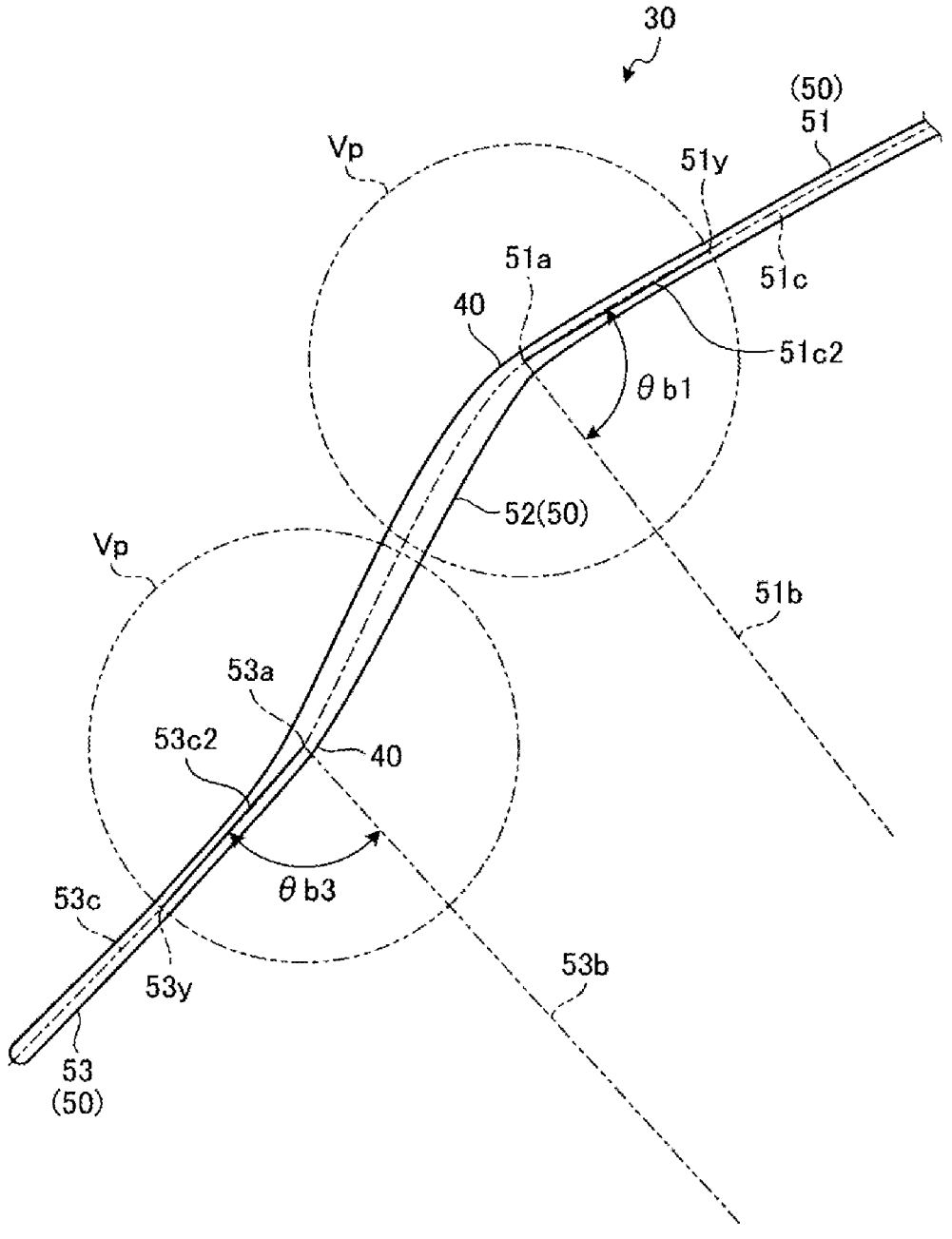
FIG. 13 is an explanatory diagram of substantial parallelism between a first extending portion and a third extending portion.

FIG. 13 is an explanatory diagram of substantial parallelism between the first extending portion 51 and the third extending portion 53. The first extending portion 51 and the third extending portion 53 of the protrusion portion 30 are such that the center line 51c of the first extending portion 51 in the width direction and the center line 53c of the third extending portion 53 in the width direction are substantially parallel to each other. Parallel in this case means that the inclination angles of the center line 51c of the first extending portion 51 and the center line 53c of the third extending portion 53 in the tire radial direction with respect to the tire circumferential direction are substantially the same. In other words, the center line 51c of the first extending portion 51 and the center line 53c of the third extending portion 53 are such that difference between the angle $\theta b1$ formed by an imaginary line 51b intersecting the first extending portion 51 and passing through the tire center and a center line 51c of the first extending portion 51 and angle $\theta b3$ formed by an imaginary line 53b intersecting the third extending portion 53 and passing through the tire center and a center line 53c of the third extending portion 53 is within a predetermined range. In the present embodiment, a form in which the difference in angles to be compared is within $\pm 10°$ is called substantially parallel.

More specifically, of the first extending portion 51 and the third extending portion 53, an imaginary circle Vp having a radius that is half the length of the third extending portion 53 that is the extending portion 50 on the shorter side is set with the end portion 51a of the first extending portion 51 near the third extending portion 53 as the center, and a line connecting the intersection 51y of the center line 51c of the first extending portion 51 and the imaginary circle Vp and the end 51a of the first extending portion 51 is defined as a temporary center line 51c2 of the first extending portion 51.

Similarly, the imaginary circle Vp is set with the end portion 53a of the third extending portion 53 near the first extending portion 51 as the center, and a line connecting the intersection 53y of the center line 53c of the third extending portion 53 and the imaginary circle Vp and the end portion 53a of the third extending portion 53 is a temporary center line 53c2 of the third extending portion 53.

Furthermore, an imaginary line 51b connecting the end portion 51a of the first extending portion 51 near the third extending portion 53 and the tire center, and an imaginary line 53b connecting the end portion 53a of the third extending portion 53 near the first extending portion 51 and the tire center are set.

The first extending portion 51 and the third extending portion 53 are such that the difference between the angle θb1 formed by the temporary center line 51c2 of the first extending portion 51 and the imaginary line 51b and the angle θb3 formed by the imaginary center line 53c2 of the third extending portion 53 and the imaginary line 53b set as described above is ±10°. Accordingly, the center line 51c of the first extending portion 51 and the center line 53c of the third extending portion 53 are such that the angles of inclination in the tire radial direction with respect to the tire circumferential direction are almost the same, and the center line 51c of the first extending portion 51 and the center line 53c of the third extending portion 53 are substantially parallel to each other.

Figure 14:
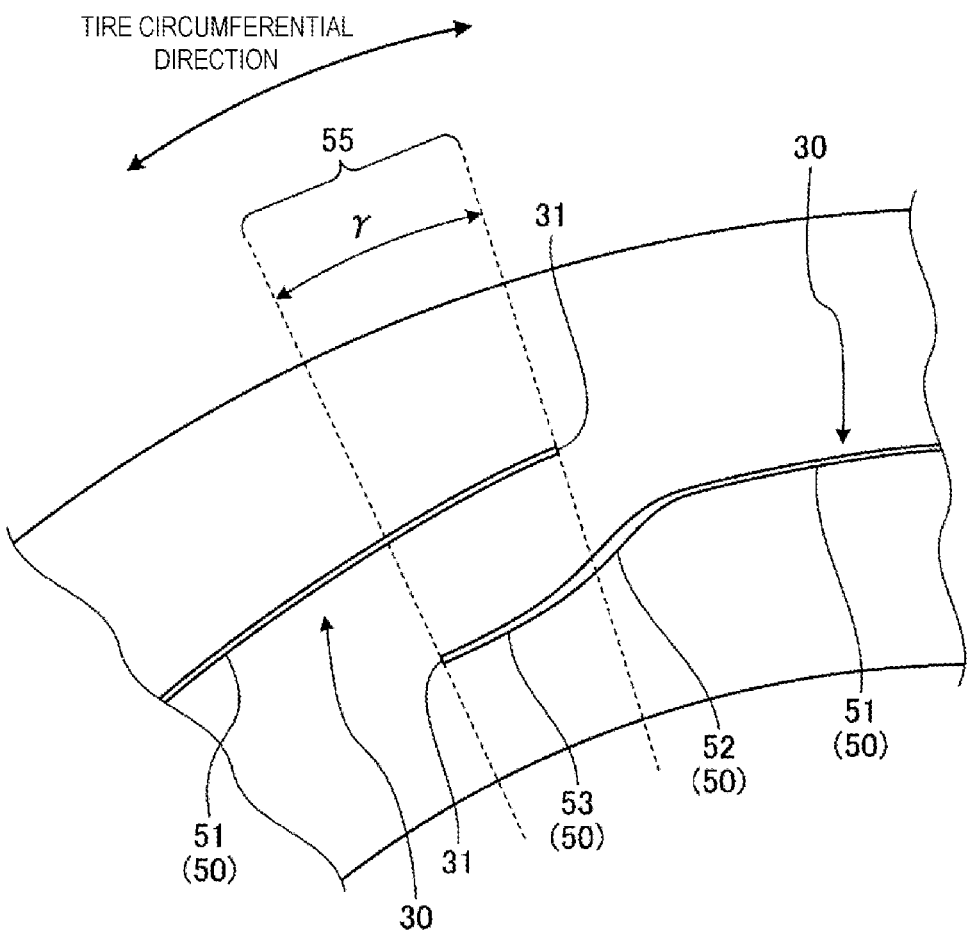
FIG. 14 is an explanatory diagram of an overlapping portion between adjacent protrusion portions.

FIG. 14 is an explanatory diagram of an overlapping portion 55 between adjacent protrusion portions 30. The protrusion portion 30 includes the overlapping portion 55 that is a portion that overlaps a different protrusion portion 30 in the tire circumferential direction. More specifically, the overlapping portion 55 is such that the positions of the protrusion portions 30 adjacent to each other in the tire circumferential direction are the same in the tire circumferential direction while the positions in the tire radial direction are different. In other words, the overlapping portion 55 is formed by two protrusion portions 30 adjacent in the tire circumferential direction, and is a portion of the protrusion portions 30 adjacent in the tire circumferential direction overlapping in the tire circumferential direction.

That is, the protrusion portions 30 are formed to be inclined in the tire radial direction with respect to the tire circumferential direction while facing in the tire circumferential direction, so each protrusion portion 30 is such that one end portion 31 and an other end portion 31 in the extending direction of the protrusion portion 30 have different positions in the tire radial direction. The plurality of protrusion portions 30 formed on one tire side portion 20 are such that the inclination directions in the tire radial direction with respect to the tire circumferential direction are all the same direction. Therefore, adjacent protrusion portions 30 are such that a position of the end portion 31 in the tire radial direction located closer to another protrusion portion 30 is different from the one thereof. As a result, adjacent protrusion portions 30 are such that the protrusion portions 30 can be overlapped with each other by locating the vicinities of the end portions 31 of different protrusion portions 30 to be close to each other, within a range in which the different protrusion portions 30 are disposed in the tire circumferential direction. The overlapping portion 55 is formed by locating a part of each of the protrusion portions 30 adjacent to each other in the tire circumferential direction within a range in the tire circumferential direction in which the other of the protrusion portions 30 is disposed.

The overlapping portion 55 of the protrusion portion 30 formed in this way is such that the angle γ in the tire circumferential direction of the range in which the overlapping portion 55 extends in the tire circumferential direction is within the range $0.05 \leq (\gamma/\alpha) \leq 0.30$ with respect to the angle α (see FIG. 4) in the tire circumferential direction in the range in which one protrusion portion 30 is disposed. The angle γ of the overlapping portion 55 is preferably within the range $0.10 \leq (\gamma/\alpha) \leq 0.20$ with respect to the angle α of the protrusion portion 30.

Figure 15:
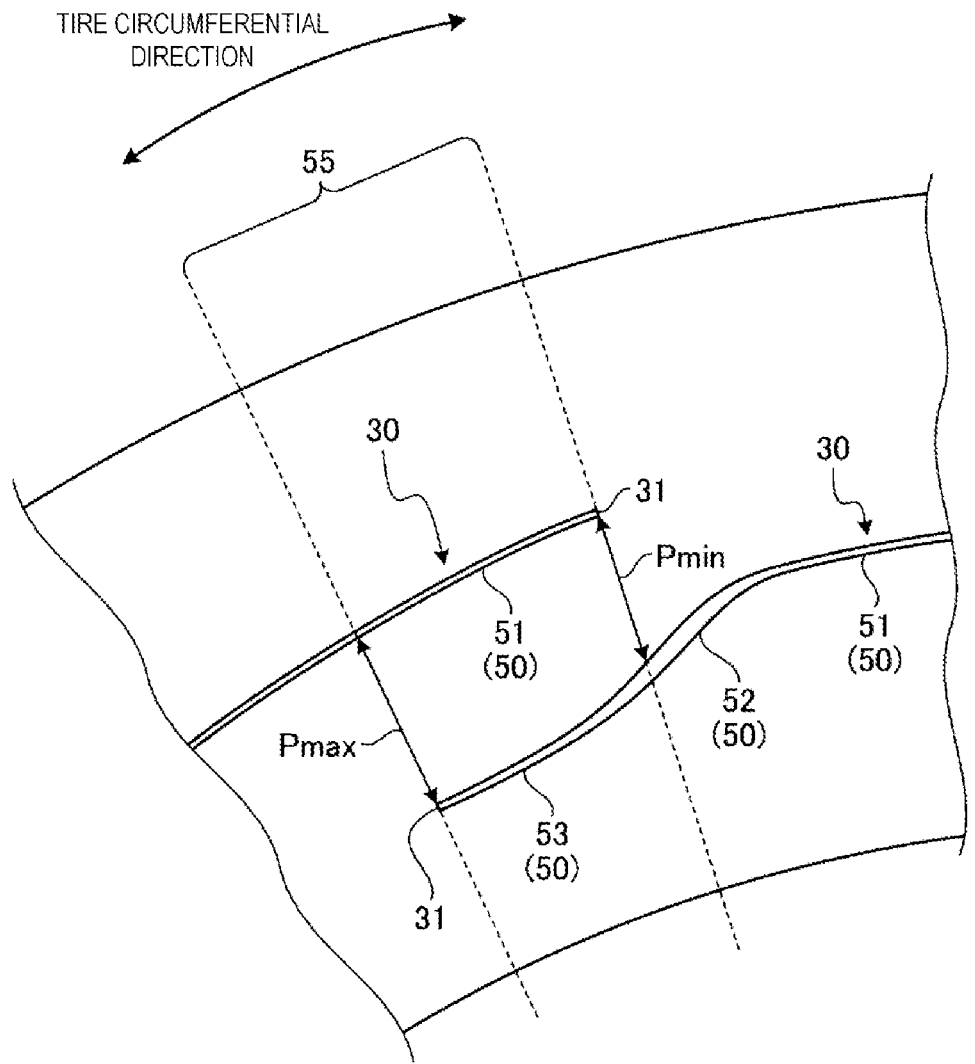
FIG. 15 is a detailed view of the overlapping portion illustrated in FIG. 14.

FIG. 15 is a detailed view of the overlapping portion 55 illustrated in FIG. 14. The two protrusion portions 30 that overlap at the overlapping portion 55 are such that the relationship between the maximum distance Pmax and the minimum distance Pmin in the tire direction between the overlapping portions is within the range $1.0 \leq (Pmax/Pmin) \leq 2.0$. In this case, the maximum distance Pmax is the distance in the tire radial direction at the portion where the distance between one protrusion portion 30 and another protrusion portion 30 in the tire radial direction is the largest, in the overlapping portion 55 formed by the protrusion portions 30 adjacent to each other in the tire circumferential direction. The minimum distance Pmin is the distance in the tire radial direction at the portion where the distance between one protrusion portion 30 and another protrusion portion 30 in the tire radial direction is the smallest, in the overlapping portion 55 formed by protrusion portions 30 adjacent to each other in the tire circumferential direction. Among these, the minimum distance Pmin is within the range $0.15 \leq (Pmin/SH) \leq 0.30$ with respect to the tire cross-sectional height SH.

Note that the maximum distance Pmax and the minimum distance Pmin in the tire direction between the overlapping portions of the overlapping portion 55 are preferably in the range $1.0 \leq (Pmax/Pmin) \leq 1.5$. That is, the maximum distance Pmax and the minimum distance Pmin may be Pmax=Pmin, or in other words, the two protrusion portions 30 overlapping in the overlapping portion 55 may be parallel to each other. Moreover, the minimum distance Pmin with respect to the tire cross-sectional height SH is preferably within the range $0.18 \leq (Pmin/SH) \leq 0.25$.

The plurality of protrusion portions 30 formed on one tire side portion 20 all overlap protrusion portions 30 adjacent in the tire circumferential direction (see FIG. 3). Therefore, the plurality of protrusion portions 30 formed on one tire side portion 20 are such that by the protrusion portions 30 adjacent to each other overlapping each other in the overlapping portion 55, one or more protrusion portions 30 are provided at any position on the tire circumference.

Additionally, the protrusion portions 30 are such that the protrusion portions 30 adjacent to each other in the tire circumferential direction all overlap, so the sum of the angles α of the plurality of protrusion portions 30 formed on one tire side portion 20 is larger than the angle 2π of one round in the tire circumferential direction. More specifically, the sum of the angles α of the plurality of protrusion portions 30 formed on one tire side portion 20 is within a range of no less than 105% and no more than 200% of the angle 2π of one round in the tire circumferential direction. Note that the total sum of the angles α of the plurality of protrusion portions 30 formed on one tire side portion 20 is preferably within a range of no less than 110% and no more than 190%, and more preferably is within a range of no less than 115% and no more than 180% of the angle 2π of one round in the tire circumferential direction.

When mounting the pneumatic tire 1 according to this embodiment on a vehicle, the rim wheel is fitted to the bead portion 5 to mount the pneumatic tire 1 on the rim wheel, and then the inner portion is filled with air, and the rim wheel is mounted on the vehicle with the pneumatic tire 1 in an inflated state. When doing this, the mounting direction with respect to the vehicle and the rotation direction when mounted on a vehicle are designated, so the pneumatic tire 1 according to the present embodiment is mounted on the vehicle in the designated direction. In other words, the pneumatic tire 1 is mounted on the vehicle in the direction designated according to the mounting direction display portion and the rotation direction display portion attached to the sidewall portion 4. More specifically, the pneumatic tire 1 is mounted on the vehicle so that, of the tire side portions 20 located on both sides in the tire width direction, the tire side portion 20 on the side where the protrusion portions 30 are formed is positioned on the outer side in the vehicle mounting direction.

When a vehicle on which the pneumatic tire 1 is mounted travels, the pneumatic tire 1 rotates while the portion of the ground contact surface 10 located below and facing the road surface comes in contact with the road surface. The vehicle travels by transmitting a driving force or a braking force to the road surface or generating a turning force by a frictional force between the ground contact surface 10 and the road surface. For example, in a case where a vehicle on which the pneumatic tire, 1 is mounted travels over a dry road surface, the vehicle travels mainly by transmitting a driving force or a braking force to the road surface or generating a turning force by a frictional force between the ground contact surface 10 and the road surface. In addition, when traveling on a wet road surface, water between the ground contact surface 10 and the road surface enters into the grooves such as circumferential grooves 16, lug grooves and the like formed on the ground contact surface 10, the vehicle travels while water is drained between the ground contact surface 10 and the road surface by these grooves. Accordingly, the ground contact surface 10 is easily grounded on the road surface, and the frictional force between the ground contact surface 10 and the road surface allows the vehicle to travel as desired.

Here, when the vehicle is traveling, the pneumatic tire 1 may come into contact with a portion other than the ground contact surface 10. For example, when the pneumatic tire 1 rides up on a curb, or when the pneumatic tire 1 gets too close to the curb during parking, the tire side surface 21 may come in contact with the curb. In this case, cracking may occur in a portion of the tire side surface 21 that is in contact with the curb, and there is a possibility that the tire side portion 20 may be damaged, and damage to the tire side portion 20 may cause a failure such as puncturing of the pneumatic tire 1.

On the other hand, in the pneumatic tire 1 according to this embodiment, protrusion portions 30 are formed on the tire side surface 21 of the tire side portion 20. Therefore, even when an obstacle such as a curb comes into contact with the tire side surface 21, the obstacle comes into contact with the protrusion portions 30, so it is possible to suppress damage to the tire side portion 20 due to an obstacle coming into contact with the tire side surface 21. Accordingly, scratch resistance may be improved.

Furthermore, the protrusion portions 30 formed on the tire side portion 20 in this way are such that when the pneumatic tire 1 rotates during traveling of the vehicle, turbulent flow may be generated in the air around the protrusion portions 30. In this way, an increase in air resistance may be suppressed. In other words, when the pneumatic tire 1 rotates, a turbulent boundary layer is generated around the protrusion portions 30 projecting from the tire side surface 21, so it becomes more difficult for air to separate from the tire side surface 21 due to the tire side surface 21 moving at high speed with respect to the surrounding air. Therefore, it is possible to suppress an increase in the air resistance caused by the air around the pneumatic tire 1 separating from the tire side surface 21, and it is possible to reduce the rolling resistance when the pneumatic tire 1 rotates. In this way, fuel economy performance may be improved.

Moreover, the protrusion portion 30 is such that the maximum width of the first extending portion 51 is within a range of no less than 1.0 mm and no more than 3.0 mm, so it is possible to more reliably suppress damage to the tire side portion 20 when an obstacle such as a curb comes into contact with the first extending portion 51, while at the same time reduce rolling resistance. In other words, the first extending portion 51 is the extending portion 50 having the longest length among the plurality of extending portions 50, so when the obstacle such as a curb comes into contact with the protrusion portion 30, it is easiest for the obstacle to come in contact with the first extending portion 51. As described above, in a case where the maximum width of the first extending portion 51 that is easily contacted by an obstacle is less than 1.0 mm, the maximum width of the first extending portion 51 is too small, so when an obstacle comes in contact with the first extending portion 51, it may be difficult for the first extending portion 51 to reduce the force received from the obstacle. In this case, the force received by the first extending portion 51 from the obstacle is easily transmitted to the inner portion of the tire side portion 20, so there is a possibility that it may be difficult to suppress damage to the tire side portion 20.

Moreover, in a case where the maximum width of the first extending portion 51 is greater than 3.0 mm, the maximum width of the first extending portion 51 is too large, so there is a possibility that the weight of the protrusion portion 30 including the first extending portion 51 may be too large, and there is a possibility that the weight of the pneumatic tire 1 may be excessively increased due to providing the protrusion portion 30 on the tire side portion 20. In this case, even though an increase in air resistance is suppressed by the protrusion portions 30, the weight of the pneumatic tire 1 increases, which may make it difficult to reduce the rolling resistance.

On the other hand, in a case where the maximum width of the first extending portion 51 is within a range of no less than 1.0 mm and no more than 3.0 mm, it is possible keep the weight of the pneumatic tire 1 from increasing too much, and the force received from the obstacle may be reduced by the first extending portion 51 even in a case where an obstacle comes in contact with the first extending portion 51. Accordingly, together with improving scratch resistance by suppressing damage to the tire side portion 20 by the protrusion portions 30, the rolling resistance during rotation of the pneumatic tire 1 may be reduced more reliably, so it is possible to improve fuel economy performance.

Furthermore, the thickness Ga of the tire side portion 20 at the tire maximum width position W is within a range of no less than 2 mm and no more than 9 mm, so it is possible to reduce the weight of the pneumatic tire 1 while suppressing damage to the tire side portion 20, and the rolling resistance may be reduced. In other words, in a case where the thickness Ga of the tire side portion 20 at the tire maximum width position W is less than 2 mm, the thickness Ga of the tire side portion 20 is too thin, so even though the protrusion portions 30 of the tire side portion 20 are provided, there is a risk that the tire side portion 20 may be damaged when an obstacle comes in contact with the protrusion portions 30. Moreover, in a case where the thickness Ga of the tire side portion 20 at the tire maximum width position W exceeds 9 mm, the weight of the tire side portion 20 becomes large, so there is a possibility that the rolling resistance may degrade.

On the other hand, the thickness Ga of the tire side portion 20 at the tire maximum width position W is within a range of no less than 2 mm and no more than 9 mm, so it is possible to reduce the weight of the pneumatic tire 1 while suppressing damage to the tire side portion 20, and the rolling resistance may be reduced. As a result, both scratch resistance and fuel economy performance may be achieved in a compatible manner.

In addition, the second extending portion 52 continuous from the first extending portion 51 via the bend portion 40 is such that the maximum width is larger than the maximum width of the first extending portion 51, so in a case where an obstacle comes in contact with the second extending portion 52, the force received from the obstacle may be easily reduced by the second extending portion 52. Accordingly, the protrusion portions 30 may more reliably suppress damage to the tire side portion 20 when an obstacle comes in contact with the tire side portion 20. As a result, scratch resistance may be improved.

Furthermore, the protrusion portions 30 are such that the maximum width of the second extending portion 52 is within a range of no less than 1.5 and no more than 5 times the maximum width of the first extending portion 51, so it is possible to more reliably suppress damage to the tire side portion 20 when an obstacle such as a curb comes into contact with the second extending portion 52 while more reliably reducing rolling resistance. In other words, in a case where the maximum width of the second extending portion 52 is less than 1.5 times the maximum width of the first extending portion 51, the maximum width of the second extending portion 52 is too small, so there is a possibility that when the obstacle comes in contact with the second extending portion 52, it will be difficult for the second extending portion 52 to reduce the force received from the obstacle. In this case, the force received by the second extending portion 52 is easily transmitted to the inner portion of the tire side portion 20, so there is a possibility that it will be difficult to suppress damage to the tire side portion 20. Moreover, in a case where the maximum width of the second extending portion 52 is larger than 5 times the maximum width of the first extending portion 51, the maximum width of the second extending portion 52 is too large, so there is a possibility that the weight of the protrusion portion 30 including the second extending portion 52 may be too large, and there is a possibility that the weight of the pneumatic tire 1 may be excessively increased due to providing the protrusion portions 30 on the tire side portion 20. In this case, even though an increase in air resistance is suppressed by the protrusion portions 30, the weight of the pneumatic tire 1 increases, which may make it difficult to reduce the rolling resistance.

On the other hand, in a case where the maximum width of the second extending portion 52 is within a range of no less than 1.5 and no more than 5 times the maximum width of the first extending portion 51, it is possible keep the weight of the pneumatic tire 1 from increasing too much, and the force received from the obstacle may be reduced by the second extending portion 52 even in a case where an obstacle comes in contact with the second extending portion 52. In this way, together with more reliably suppressing damage to the tire side portion 20 by the protrusion portions 30, it is possible to more reliably reduce the rolling resistance during rotation of the pneumatic tire 1.

As a result, both scratch resistance and fuel economy performance may be more reliably achieved in a compatible manner.

Furthermore, the protrusion portions 30 are such that the maximum height of the second extending portion 52 is within a range of no less than 1.1 and no more than 3.0 times the maximum width of the second extending portion 52, so it is possible to more reliably suppress damage to the tire side portion 20 when an obstacle such as a curb comes into contact with the second extending portion 52 while more reliably reducing rolling resistance. In other words, in a case where the maximum height of the second extending portion 52 is less than 1.1 times the maximum width of the second extending portion 52, the maximum height of the second extending portion 52 is too low, so there is a possibility that when an obstacle comes in contact with the second extending portion 52, it will be difficult for the second extending portion 52 to reduce the force received from the obstacle. In this case, the force received by the second extending portion 52 is easily transmitted to the inner portion of the tire side portion 20, so there is a possibility that it will be difficult to suppress damage to the tire side portion 20. Additionally, in a case where the maximum height of the second extending portion 52 is greater than 3.0 times the maximum width of the second extending portion 52, the maximum height of the second extending portion 52 is too high, so there is a possibility that the weight of the protrusion portion 30 including the second extending portion 52 may be too large, and there is a possibility that the weight of the pneumatic tire 1 may be excessively increased due to providing the protrusion portions 30 on the tire side portion 20. In this case, even though an increase in air resistance is suppressed by the protrusion portions 30, the weight of the pneumatic tire 1 increases, which may make it difficult to reduce the rolling resistance.

On the other hand, in a case where the maximum height of the second extending portion 52 is within a range of no less than 1.1 and no more than 3.0 times the maximum width of the second extending portion 52, it is possible keep the weight of the pneumatic tire 1 from increasing too much, and the force received from the obstacle may be reduced by the second extending portion 52 even in a case where an obstacle comes in contact with the second extending portion 52. In this way, together with more reliably suppressing damage to the tire side portion 20 by the protrusion portions 30, it is possible to more reliably reduce the rolling resistance during rotation of the pneumatic tire 1. As a result, both scratch resistance and fuel economy performance may be more reliably achieved in a compatible manner.

In addition, the protrusion portions 30 are such that the angle θ1 formed by the center line 51c of the first extending portion 51 in the width direction and the center line 52c in the width direction of the second extending portion 52 is within the range $90° \leq θ1 \leq 170°$, so it is possible to more reliably reduce rolling resistance while suppressing the occurrence of cracks at the positions of the bend portions 40. In other words, in a case where the angle θ1 is less than 90°, the angle formed by the first extending portion 51 and the second extending portion 52 is too small, so there is a possibility that when the vehicle is traveling, the tire side portion 20 may bend or the like, making it easy for stress concentration to occur near the position of the bend portion 40. In this case, there is a risk that cracking may easily occur at the position of the bend portion 40. Furthermore, in a case where the angle θ1 exceeds 170°, the angle formed by the first extending portion 51 and the second extending portion 52 is too large, so it is difficult to effectively obtain the effect of generating turbulent flow by forming a bend portion 40 in the protrusion portion 30. In this case, it is difficult to effectively suppress the increase in air resistance when the pneumatic tire 1 is rotated, which may make it difficult to reduce rolling resistance.

On the other hand, in a case where the angle θ1 is within the range 90°≤ θ1≤170°, the effect of generating a turbulent flow by forming the bend portion 40 in the protrusion portion 30 may be effectively obtained while suppressing the occurrence of cracking at the position of the bend portion 40, and rolling resistance may be more reliably reduced. As a result, it is possible to more reliably improve fuel economy performance while suppressing damage to the tire side portion 20.

Additionally, the protrusion portions 30 are such that the length C1 of the first extending portion 51 is within a range of no less than 1.5 and no more than 30 times the length C2 of the second extending portion 52, so turbulent flow can be more effectively generated, the first extending portion 51 can be formed with high accuracy, and the first extending portion 51 can more reliably protect the tire side portion 20 and generate turbulent flow. In other words, in a case where the length C1 of the first extending portion 51 is less than 1.5 times the length C2 of the second extending portion 52, the length C1 of the first extending portion 51 will be too short, and as a result, even though the protrusion portions 30 are provided, it may be difficult to effectively generate turbulent flow in the air around the protrusion portions 30. In this case, there is a possibility that it may be difficult to reduce the rolling resistance by suppressing an increase in air resistance during rotation of the pneumatic tire 1.

Moreover, in a case where the length C1 of the first extending portion 51 is longer than 30 times the length C2 of the second extending portion 52, the length C1 of the first extending portion 51 is too long, so there is a possibility that it may be difficult to appropriately mold the first extending portion 51 during vulcanization molding when manufacturing the pneumatic tire 1. In other words, the protrusion portions 30 are formed by vulcanization molding a so-called green tire, which is a tire prior to vulcanization molding using a mold in which the shapes of the protrusion portions 30 are formed; however, in a case where the length C1 of the first extending portion 51 is too long, the portion of the mold where the first extending portion 51 is formed will also be long. Thus, in this case, the portion of the mold where the first extending portion 51 is formed is too long, so when performing vulcanization molding of the green tire, it becomes difficult for the rubber to go through the portion of the mold where the first extending portion 51 is formed, so there is a possibility that it may be difficult to accurately mold the first extending portion 51. In a case where the first extending portion 51 cannot be precisely molded, there is a possibility that partial defects may occur and that the first extending portion 51 may not be formed in a desired shape, and there is a possibility that the effect of protecting the tire side portion 20 with the first extending portion 51 and generating turbulence may be reduced.

On the other hand, in a case where the length C1 of the first extending portion 51 is within a range of no less than 1.5 and no more than 30 times the length C2 of the second extending portion 52, turbulent flow can be effectively generated by the protrusion portions 30 including the first extending portion 51, and the first extending portion 51 can be molded with high accuracy, so the first extending portion 51 may more reliably protect the tire side portion 20 and generate turbulent flow. As a result, both scratch resistance and fuel economy performance may be more reliably achieved in a compatible manner.

Furthermore, the plurality of extending portions 50 of the protrusion portions 30 each has a width Wc within a range of no less than 0.8 and no more than 1.0 times the maximum width of the extending portion 50 within one extending portion 50, so it is possible to prevent the difference in rigidity from becoming too large in the extending portions 50, and it is possible to prevent the rigidity of the tire side portion 20 from greatly changing depending on the position in the tire circumferential direction. Accordingly, the rolling resistance can be reduced even more reliably. In other words, in a case where the extending portion 50 includes a portion in which the width Wc is less than 0.8 times the maximum width of the extending portion 50 within one extending portion 50, the change of the width Wc within one extending portion 50 is too large, so there is a risk that the difference in rigidity within the extending portion 50 will become too large, or in other words, there is a possibility that the difference in rigidity within the protrusion portion 30 will become too large. In this case, as the difference in rigidity within the protrusion portion 30 is increased, the rigidity of the tire side portion 20 may also vary greatly depending on the position in the tire circumferential direction. When the rigidity of the tire side portion 20 varies greatly due to the position in the tire circumferential direction, uniformity of the pneumatic tire 1 will be easily reduced, and therefore, the rolling resistance tends to be negatively affected due to the reduction in uniformity.

On the other hand, in a case where the plurality of extending portions 50 are within a range of no less than 0.8 and no more than 1.0 times the maximum width of the extending portion 50 within one extending portion 50, it is possible to suppress the change in the width Wc from becoming too large in one extending portion 50, and it is possible to suppress the increase in the difference in rigidity within the extending portion 50 or within the protrusion portion 30. In this way, a large change in the rigidity of the tire side portion 20 due to the position in the tire circumferential direction may be suppressed, and a reduction in uniformity of the pneumatic tire 1 may be suppressed, so the rolling resistance may be more reliably reduced. As a result, it is possible to more reliably improve fuel economy performance.

Furthermore, the protrusion portions 30 are such that the maximum height of the first extending portion 51 is within a range of no less than 1.1 and no more than 5.0 times the maximum width of the first extending portion 51, so it is possible to more reliably suppress damage to the tire side portion 20 when an obstacle such as a curb comes into contact with the first extending portion 51 while more reliably reducing rolling resistance. In other words, in a case where the maximum height of the first extending portion 51 is less than 1.1 times the maximum width of the first extending portion 51, the maximum height of the first extending portion 51 is too low, so there is a possibility that when an obstacle comes in contact with the first extending portion 51, it will become difficult for the first extending portion 51 to reduce the force received from the obstacle. In this case, the force received by the first extending portion 51 from the obstacle is easily transmitted to the inner portion of the tire side portion 20, so there is a possibility that it may be difficult to suppress damage to the tire side portion 20. Additionally, in a case where the maximum height of the first extending portion 51 is greater than 5.0 times the maximum width of the first extending portion 51, the maximum height of the first extending portion 51 is too high, so there is a possibility that the weight of the protrusion portion 30 including the first extending portion 51 may be too large, and there is a possibility that the weight of the pneumatic tire 1 may be excessively increased due to providing the protrusion portions 30 on the tire side portion 20. In this case, even though an increase in air resistance is suppressed by the protrusion portions 30, the weight of the pneumatic tire 1 increases, which may make it difficult to reduce the rolling resistance.

On the other hand, in a case where the maximum height of the first extending portion 51 is within a range of no less than 1.1 and no more than 5.0 times the maximum width of the first extending portion 51, it is possible keep the weight of the pneumatic tire 1 from increasing too much, and the force received from the obstacle may be reduced by the first extending portion 51 even in a case where an obstacle comes in contact with the first extending portion 51. In this way, together with more reliably suppressing damage to the tire side portion 20 by the protrusion portions 30, it is possible to more reliably reduce the rolling resistance during rotation of the pneumatic tire 1. As a result, both scratch resistance and fuel economy performance may be more reliably achieved in a compatible manner.

In addition, the protrusion portion 30 is such that of the plurality of extending portions 50, the first extending portion 51 is disposed on the outermost side in the tire radial direction, so it is possible to more effectively obtain the effect of suppressing the increase in air resistance by generating the turbulent flow by the protrusion portion 30. In other words, when the pneumatic tire 1 is rotated, the peripheral speed increases going toward the outer side in the tire radial direction, so the difference in the relative velocity between the tire side surface 21 and the ambient air also increases toward the outer side in the tire radial direction. Therefore, by disposing the first extending portion 51 on the outermost side in the tire radial direction, the extending portion 50 having the longest length of the plurality of extending portions 50 can be disposed at a position where the difference in relative velocity between the ambient air is large. Accordingly, when turbulent flow is generated by the first extending portion 51, an increase in the air resistance during rotation of the pneumatic tire 1 may be more effectively suppressed, and rolling resistance may be more reliably reduced. As a result, it is possible to more reliably improve fuel economy performance.

Additionally, because the protrusion portion 30 includes a plurality of bend portions 40, it is possible to more reliably generate turbulent flow by the plurality of bend portions 40. Moreover, the protrusion portion 30 includes a plurality of the bend portions 40, so the entire length of the protrusion portion 30 will inevitably be longer, and therefore the protrusion portion 30 may more reliably generate turbulent flow. In this way, an increase in air resistance when the pneumatic tire 1 is rotated may be effectively suppressed by the turbulent flow, and rolling resistance may be more reliably reduced. As a result, it is possible to more reliably improve fuel economy performance.

Furthermore, the protrusion portion 30 is such that the length C1 of the first extending portion 51 is within a range of no less than 1.2 and no more than 25 times the length C3 of the third extending portion 53, which is the extending portion 50 other than the second extending portion 52 and the first extending portion 51, so turbulent flow can be more effectively generated, the first extending portion 51 can be formed with high accuracy, and the first extending portion 51 can more reliably protect the tire side portion 20 and generate turbulent flow. In other words, in a case where the length C1 of the first extending portion 51 is less than 1.2 times the length C3 of the third extending portion 53, the length C1 of the first extending portion 51 will be too short, so even though the protrusion portions 30 are provided, it may be difficult to effectively generate turbulent flow in the air around the protrusion portions 30. In this case, there is a possibility that it may be difficult to reduce the rolling resistance by suppressing an increase in air resistance during rotation of the pneumatic tire 1. Moreover, in a case where the length C1 of the first extending portion 51 is longer than 25 times the length C3 of the third extending portion 53, the length C1 of the first extending portion 51 is too long, so there is a possibility that it may be difficult to appropriately mold the first extending portion 51 during vulcanization molding when manufacturing the pneumatic tire 1. In this case there is a possibility that partial defects may occur in the first extending portion 51 and that the first extending portion 51 may not be formed in a desired shape, and there is a possibility that the effect of protecting the tire side portion 20 by the first extending portion 51 and generating turbulence may be reduced.

On the other hand, in a case where the length C1 of the first extending portion 51 is within a range of no less than 1.2 and no more than 25 times the length C3 of the third extending portion 53, turbulent flow can be effectively generated by the protrusion portions 30 including the first extending portion 51, and the first extending portion 51 can be molded with high accuracy, so the first extending portion 51 may more reliably protect the tire side portion 20 and generate turbulent flow. As a result, both scratch resistance and fuel economy performance may be more reliably achieved in a compatible manner.

Moreover, the protrusion portion 30 is such that the angle $\theta$n formed by the center lines of the two extending portions 50 continuous through the bend portion 40 in the respective width directions is within the range $90°\leq\theta n\leq 170°$, so it is possible to more reliably reduce the rolling resistance while suppressing the occurrence of cracking at all the bend portions 40. In other words, in a case where the bend portion 40 has an angle $\theta$n of less than 90°, the angle formed by the two extending portions 50 that are continuous through the bend portion 40 is too small, so there is a possibility that when the vehicle is traveling, the tire side portion 20 may bend or the like, and that stress concentration will tend to occur near the position of the bend portion 40. In this case, there is a possibility that cracking will easily occur at the position of the bend portion 40. In addition, in a case where the bend portion 40 has an angle $\theta$n greater than 170°, the angle formed by the two continuous extending portions 50 via the bend portion 40 is too large, so it may be difficult to effectively obtain the effect of generating turbulent flow by forming the bend portions 40 in the protrusion portion 30. In this case, it is difficult to effectively suppress the increase in air resistance when the pneumatic tire 1 is rotated, which may make it difficult to reduce rolling resistance.

On the other hand, when the angle $\theta$n is within the range $90°\leq\theta n\leq 170°$, the effect of generating turbulent flow by forming the plurality of bend portions 40 in the protrusion portion 30 may be effectively obtained while suppressing the occurrence of cracking at all the positions of the bend portions 40, and rolling resistance may be more reliably reduced. As a result, it is possible to more reliably improve fuel economy performance while suppressing damage to the tire side portion 20.

In addition, the protrusion portion 30 is such that the center line 51c of the first extending portion 51 and the center line 53c of the third extending portion 53 are substantially parallel, so turbulent flow can be generated with respect to air around the tire side surface 21 in a manner where the same kind of turbulent flow is generated between the first extending portion 51 and the third extending portion 53, which have different positions in the tire radial direction. As a result, the flow of air around the tire side surface 21 is not disturbed more than necessary, and a certain form of turbulent flow can be generated in a wide range in the tire radial direction. Accordingly, when the increase in air resistance during rotation of the pneumatic tire 1 is suppressed by turbulent flow, increases in air resistance can be effectively suppressed, and rolling resistance can be more reliably reduced. As a result, it is possible to more reliably improve fuel economy performance.

In addition, because only one end portion side of the protrusion portion 30 in the extending direction of the first extending portion 51 is defined by the bend portion 40, an effect of suppressing an increase in air resistance by generating turbulent flow by the protrusion portion 30 can be obtained more effectively. In other words, the first extending portion 51, which has the longest length among the plurality of extending portions 50 and can effectively generate turbulent flow, is such that only one end side is defined by the bend portion 40, and by not forming another extending portion 50 on the other end portion side, the first extending portion can more effectively demonstrate the effect of generating turbulent flow by the first extending portion 51. As a result, an increase in air resistance when the pneumatic tire 1 is rotated may be more effectively suppressed by the turbulent flow generated by the first extending portion 51, and rolling resistance may be more reliably reduced. As a result, it is possible to more reliably improve fuel economy performance.

Additionally, the first extending portion 51 of the protrusion portion 30 is such that the height H1 from the tire side surface 21 is lowest at the position of the end portion 51a on the outer side in the tire radial direction, so the height H1 may be prevented from becoming too high at a position where the peripheral speed of the rotating pneumatic tire 1 increases. As a result, due to the height H1 of the first extending portion 51 being too high at the position where the peripheral speed increases, excessive turbulent flow can be generated in the first extending portion 51, and the air resistance of the first extending portion 51 is prevented from becoming too large. Accordingly, the increase in air resistance when the pneumatic tire 1 is rotated can be more reliably suppressed, and rolling resistance can be more reliably reduced. As a result, it is possible to more reliably improve fuel economy performance.

In addition, the first extending portion 51 of the protrusion portion 30 is such that the height H1 from the tire side surface 21 becomes lower going toward the outer side in the tire radial direction, so by making the change in height H1 from the tire side surface 21 as gentle as possible while generating turbulent flow by the first extending portion 51, it is possible to suppress an excessive increase in air resistance due to the provision of the protrusion portion 30. Accordingly, an increase in air resistance when the pneumatic tire 1 is rotated can be more reliably suppressed, and rolling resistance can be more reliably reduced. As a result, it is possible to more reliably improve fuel economy performance.

Moreover, the protrusion portion 30 is such that the tire maximum width position W on the tire side surface 21 formed so as to extend across the tire radial direction, so the position at which turbulent flow is generated by the protrusion portion 30 can be more reliably located near the center of the tire cross-sectional height SH in the tire radial direction. In this way, the rolling resistance may be more reliably reduced by the turbulent flow generated by the protrusion portion 30. As a result, it is possible to more reliably improve fuel economy performance.

Additionally, the protrusion portions 30 are formed on the tire side portion 20 on the outer side in the vehicle mounting direction, so scratch resistance and fuel economy performance may be more effectively improved. In other words, the tire side surface 21 on the outer side in the vehicle mounting direction is a portion that constitutes the appearance of the vehicle, so it becomes easy to come in contact with an obstacle such as a curb or the like.

Thus, by forming the protrusion portions 30 on the tire side surface 21 on the outer side in the vehicle mounting direction, the tire side surface 21 on the outer side in the vehicle mounting direction, which is prone to contact an obstacle such as curb, may be more reliably protected by the protrusion portions 30. Furthermore, the tire side surface 21 on the outer side in the vehicle mounting direction faces the outer side of the vehicle over the entire surface, making it easier to receive a direct flow of air during traveling of the vehicle. Accordingly, by forming the protrusion portions 30 on the tire side surface 21 on the outer side in the vehicle mounting direction, turbulent flow may be effectively generated at a position where the flow of air during traveling of the vehicle is easily received, increases in the air resistance when the pneumatic tire 1 is rotated may be effectively suppressed, and rolling resistance may be more reliably reduced. As a result, both scratch resistance and fuel economy performance may be more reliably achieved in a compatible manner.

MODIFIED EXAMPLES

Figure 16:
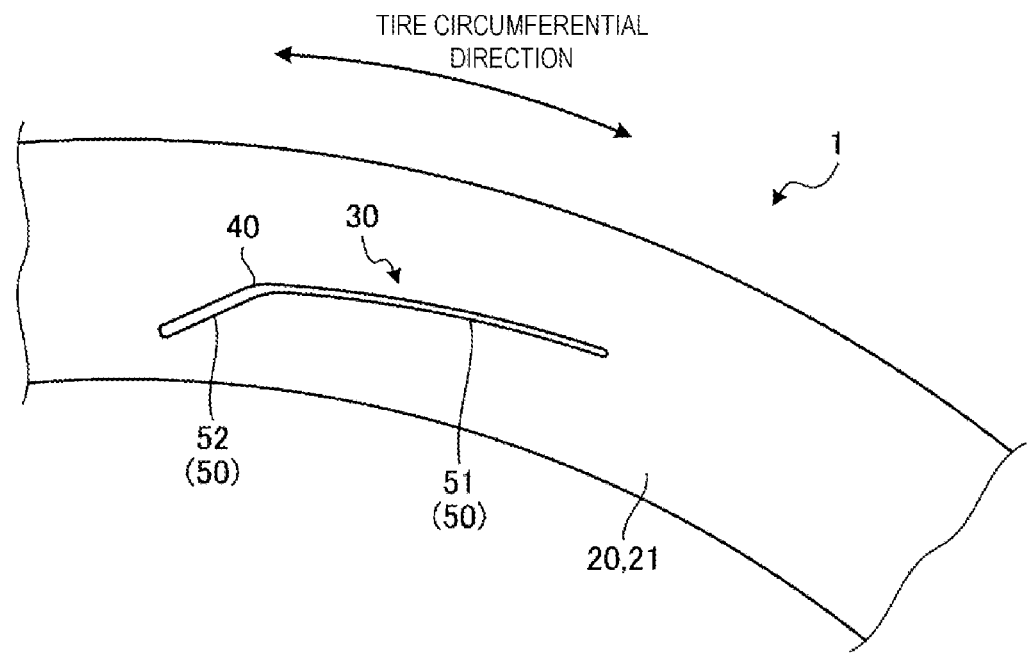
FIG. 16 is a modified example of a pneumatic tire according to an embodiment, and is an explanatory diagram of a case where there is one bend portion in the protrusion portion.
Figure 17:
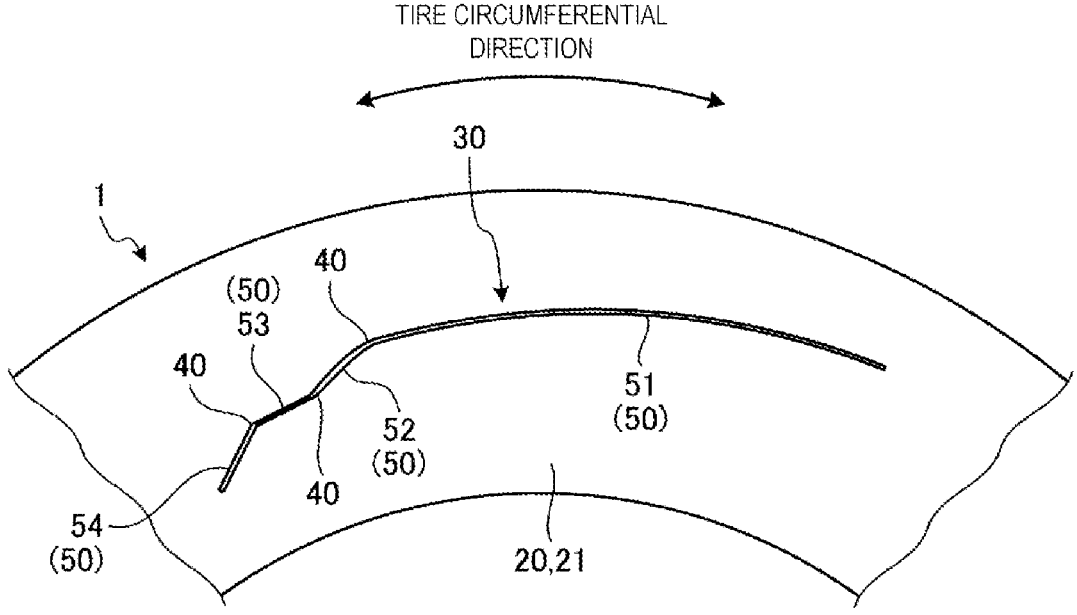
FIG. 17 is a modified example of a pneumatic tire according to an embodiment, and is an explanatory diagram of a case where there are three bend portions in the protrusion portion.

Note that in the pneumatic tire 1 according to the embodiment described above, two bend portions 40 are formed on one protrusion portion 30, but two or more bend portions 40 may be formed. FIG. 16 is a modified example of a pneumatic tire 1 according to an embodiment, and is an explanatory diagram of a case where there is one bend portion 40 in the protrusion portion 30. FIG. 17 is a modified example of a pneumatic tire 1 according to an embodiment, and is an explanatory diagram of a case where there are three bend portions 40 in the protrusion portion 30. The bend portions 40 formed on one protrusion portion 30 may be, for example, one as illustrated in FIG. 16, or three as illustrated in FIG. 17. In other words, in the protrusion portion 30, as illustrated in FIG. 16, the extending portions 50 formed by the bend portion 40 may be defined into two extending portions by one bend portion 40: a first extending portion 51 and a second extending portion 52; or as illustrated in FIG. 17, may be defined into four extending portions by three bend portions 40: a first extending portion 51, a second extending portion 52, a third extending portion 53, and a fourth extending portion 54. Regardless of the number of bend portions 40, by the bend portions 40 being formed, the protrusion portion 30 can easily generate turbulent flow at the position of the bend portions 40. In this way, an increase in air resistance when the pneumatic tire 1 is rotated may be effectively suppressed by the turbulent flow, rolling resistance may be more reliably reduced, and fuel economy performance may be improved.

Figure 18:
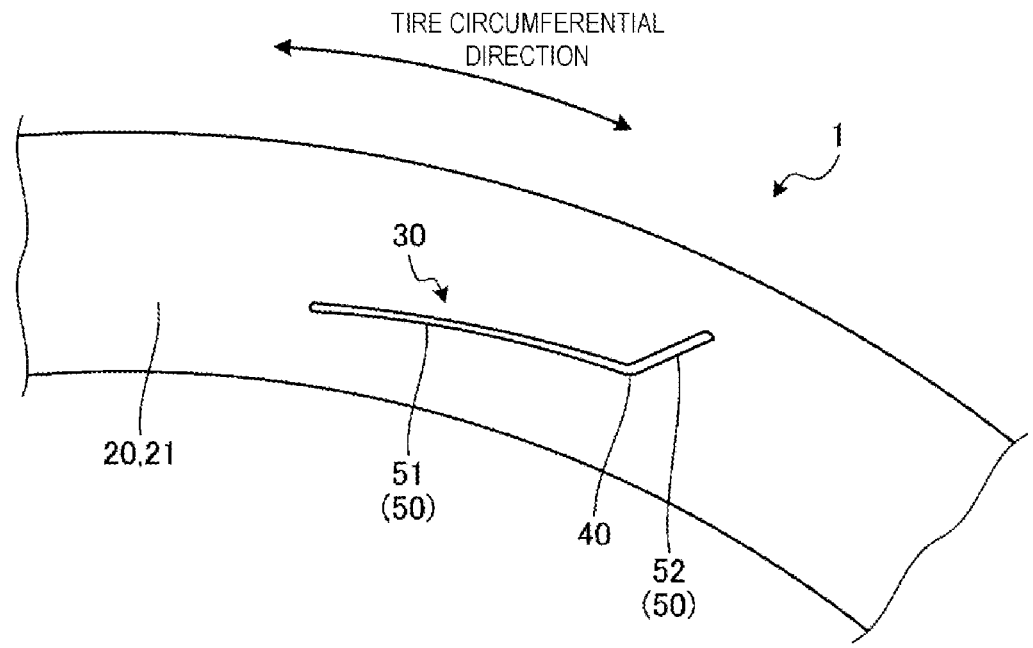
FIG. 18 is a modified example of a pneumatic tire according to an embodiment, and is an explanatory diagram

In the pneumatic tire 1 according to the embodiment described above, the first extending portion 51 having the longest length of the plurality of extending portions 50 of one protrusion portion 30 is positioned on the outermost side in the tire radial direction; however, the first extending portion 51 does not have to be positioned on the outermost side in the tire radial direction. FIG. 18 is a modified example of a pneumatic tire 1 according to an embodiment, and is an explanatory diagram of a case in which the first extending portion 51 is positioned further toward the inner side in the tire radial direction than the second extending portion 52. The extending portions 50 formed on one protrusion portion 30 may be such that, as illustrated in FIG. 18, for example, the first extending portion 51, which is the extending portion 50 having the longest length of the plurality of extending portions 50, is positioned further on the inner side in the tire radial direction than the second extending portion 52. The first extending portion 51 having the longest length is such that even though not positioned in the outermost side in the tire radial direction, by forming the maximum width of the first extending portion 51 within a range of no less than 1.0 mm and no more than 3.0 mm, the protrusion portion 30 can be easily brought into contact with an obstacle that is likely to come into contact with the tire side surface 21, and the protrusion portion 30 can effectively generate turbulent flow while suppressing an increase in weight. Accordingly, scratch resistance and fuel consumption performance can be achieved in a compatible manner.

Additionally, in the pneumatic tire 1 according to the embodiment described above, the second extending portion 52, which is the highest extending portion 56 of the plurality of extending portions 50, has the highest average extending portion height, and the first extending portion 51 and the third extending portion 53 have an average extending portion height that is lower than that of the second extending portion 52; however, even in a case where there are three or more bend portions 40 formed on one protrusion portion 30, it is preferable that an average extending portion height decrease as the extending portions 50 move away from the highest extending portion 56. FIG. 19 is a modified example of a pneumatic tire 1 according to an embodiment, and is an explanatory diagram of an average extending portion height of a plurality of extending portions 50 of a protrusion portion 30 including four bend portions 40. In a case where, for example, four bend portions 40 are formed in one protrusion portion 30 and five extending portions 50 are defined by the bend portions 40, as illustrated in FIG. 19, preferably the average extending portion height of the extending portions 50 other than the highest extending portion 56 becomes lower going away from the highest extending portion 56 in a case where the highest extending portion 56 is the extending portion 50 located at the center among the five extending portions 50 in the direction in which the extending portions 50 are arranged.

More specifically, in the protrusion portion 30 illustrated in FIG. 19, by the extending portion 50 located at the center in the direction in which the extending portions 50 are arranged having a maximum height portion Hm which is a portion having the highest height in the protrusion portion 30, that extending portion 50 is provided as the highest extending portion 56. Moreover, of the plurality of extending portions 50, the extending portion 50 that is continuous from the highest extending portion 56 via the bend portion 40 is provided as an adjacent extending portion 57, and the adjacent extending portion 57 has an average extending portion height that is lower than an average extending portion height of the highest extending portion 56.

Furthermore, in the protrusion portion 30 illustrated in FIG. 19, of the plurality of extending portions 50, the extending portion 50 positioned on the opposite side to the side where the highest extending portion 56 is located as seen from the adjacent extending portion 57 has an average extending portion height that is lower than or equal to an average extending portion height of the adjacent extending portion 57. In other words, the protrusion portion 30 is such that the plurality of extending portions 50 from the adjacent extending portion 57 to the extending portion 50 located at the end in the extending direction of the protrusion portion 30 have an average extending portion height that is lower than or equal to the average extending portion height of the adjacent extending portion 57.

The protrusion portion 30 is such that by the height becoming lower going away from the highest extending portion 56 in the extending direction of the protrusion portion 30, it is possible to suppress an excessive increase in air resistance due to the provision of the protrusion portion 30 by making the change in height from the tire side surface 21 as gentle as possible, while at the same time generate turbulent flow by the protrusion portion 30. Accordingly, an increase in air resistance when the pneumatic tire 1 is rotated can be more reliably suppressed, and rolling resistance can be more reliably reduced. As a result, it is possible to more reliably improve fuel economy performance.

As described above, the protrusion portion 30 is such that regardless of the number of bend portions 40 preferably the height Hc of the extending portion 50 located further on the outer side in the tire radial direction from at least the highest extending portion 56 is lower than the height Hc of the highest extending portion 56, and more preferably the height Hc of the extending portion 50 located further on the inner side in the tire radial direction than the highest extending portion 56 is also lower than the height Hc of the highest extending portion 56. In this case, the height Hc of the protrusion portion 30 decreases gradually from the maximum height Hm toward the outer side in the tire radial direction or from the maximum height Hm toward the inner side in the tire radial direction.

Furthermore, the width Wc of the protrusion portion 30 is such that in the extending portion 50 among the plurality of extending portions 50 having the maximum width portion Wm of the protrusion portion 30 a predetermined range in the extending portion 50, or the entire range of the extending portion 50 may be formed having a width Wc of the maximum width portion Wm.

Moreover, the protrusion portion 30 is such in the extending portion 50 of the plurality of extending portions 50 that is further on the outer side in the tire radial direction from the extending portion 50 having the maximum width portion Wm of the protrusion portion 30, the width Wc is preferably narrower than the width Wc of the extending portion 50 having the maximum width portion Wm, and in the extending portion 50 further on the inner side in the tire radial direction than the extending portion 50 having the maximum width Wm, the width Wc is also preferably narrower than the width Wc of the extending portion 50 having the maximum width portion Wm.

In the pneumatic tire 1 according to the embodiment described above, the cross-sectional shape of the protrusion portion 30 when viewed in the extending direction of the protrusion portion 30 is formed having a substantially rectangular shape in which the height direction of the protrusion portion 30 is the longitudinal direction; however, the protrusion portion 30 may have a shape other than that. FIG. 20 is a modified example of a pneumatic tire 1 according to an embodiment, and is an explanatory diagram of a case in which the cross-sectional shape of the protrusion portion 30 is formed into a rectangular shape having a lateral length. FIG. 21 is a modified example of a pneumatic tire 1 according to an embodiment, and is an explanatory diagram of a case in which the cross-sectional shape of the protrusion portion 30 is formed into a trapezoidal shape. FIG. 22 is a modified example of a pneumatic tire 1 according to an embodiment, and is an explanatory diagram of a case in which the cross-sectional shape of the protrusion portion 30 is formed into a triangular shape. The protrusion portion 30 may be, as illustrated in FIG. 20, for example, formed such that the cross-sectional shape when viewed in the extending direction of the protrusion portion 30 is a substantially rectangular shape in which the width direction of the protrusion portion 30 is the longitudinal direction. Moreover, the protrusion portion 30 is such that the width may change depending on the position in the height direction from the tire side surface 21, so the cross-sectional shape of the protrusion portion 30, as illustrated in FIG. 21 for example, may be formed in a substantially trapezoidal shape, the width of which narrows going away from the tire side surface 21, or as illustrated in FIG. 22, may be formed in a triangular shape.

As described above, the cross-sectional shape of the protrusion portion 30 may be any shape that can project from the tire side surface 21 and generate turbulent flow. Additionally, the protrusion portion 30 does not have to have the same shape depending on the position of the protrusion portion 30 in the extending direction, and the cross-sectional shape may vary depending on the position in the extending direction of the protrusion portion 30.

FIG. 23 is a modified example of a pneumatic tire 1 according to an embodiment, and is an explanatory diagram of a case in which arc portions 35 are formed at the base of the protrusion portion 30. Moreover, in a case where an arc portion 35 as illustrated in FIG. 23 is formed in a portion of the protrusion portion 30 connected to the tire side surface 21, or in other words, in a base portion of the protrusion portion 30, for the purpose of reducing stress concentration and convenience of manufacturing, the width Wc of the protrusion portion 30 is preferably a width including the arc portion 35. By defining a width of the protrusion portion 30 including the arc portion 35 as the width Wc of the protrusion portion 30, the shape of the protrusion portion 30 may be made more appropriate in consideration of reduction of stress concentration and convenience in manufacturing.

Additionally, in the pneumatic tire 1 according to the embodiment described above, the protrusion portion 30 may be formed on the tire side portion 20 on the outer side in the vehicle mounting direction; however, the protrusion portion 30 may also be formed on the tire side portion 20 on the inner side in the vehicle mounting direction, or in other words, the protrusion portion 30 may also be formed on the tire side surface 21 of the tire side portion 20 on both sides in the tire width direction. By forming the protrusion portion 30 on the tire side surface 21 on both sides in the tire width direction, the tire side surface 21 on both sides in the tire width direction can may be protected by the protrusion portion 30, and an increase in air resistance during rotation of the pneumatic tire 1 may be suppressed by the tire side surface 21 on both sides in the tire width direction, and thus rolling resistance may be reduced more reliably. As a result, scratch resistance and fuel consumption performance can be achieved in a more compatible manner.

Furthermore, the protrusion portion 30 may be formed only on the tire side surface 21 on the inner side in the vehicle mounting direction. The tire side surface 21 on the inner side in the vehicle mounting direction does not face the outer side of the vehicle, so it is difficult to see from the outside of the vehicle. Therefore, when the protrusion portion 30 is formed on the tire side surface 21 on the inner side in the vehicle mounting direction, the protrusion portion 30 is also difficult to see. As a result, by forming the protrusion portion 30 on the tire side surface 21 on the inner side in the vehicle mounting direction, scratch resistance and fuel consumption performance can be achieved in a compatible manner without affecting the appearance of the vehicle.

As described above, a secondary effect obtained differs depending on the tire side portion 20 provided with the protrusion portion 30, so the protrusion portion 30 may be formed on at least one tire side portion of the tire side portions 20 located on both sides in the tire width direction, depending on the usage of the pneumatic tire 1 and the vehicle.

Moreover, in the pneumatic tire 1 according to the embodiment described above, an imaginary circle Vc (see FIG. 8) used to obtain the angle $\theta$n formed by the center lines of two continuous extending portions 50 via the bend portion 40, or an imaginary circle Vc used when comparing the inclinations of the extending portions 50 (see FIG. 9), or an imaginary circle Vp used to specify that the first extending portion 51 and the third extending portion 53 are substantially parallel (see FIG. 13) are such that of the extending portions 50 compared, the radius is half the length of the extending portion 50 on the shorter side; however, the imaginary circle Vc and the imaginary circle Vp may have other sizes. As the imaginary circle Vc and the imaginary circle Vp, it is possible to use a circle having a preset radius, for example, a circle having a radius of 10 mm may be used. As the imaginary circle Vc and the imaginary circle Vp, preferably an appropriate circle according to the size and shape of the protrusion portion 30 is used.

Furthermore, in the pneumatic tire 1 according to the above-described embodiment, the plurality of protrusion portions 30 and the first extending portions 51 formed on one tire side surface 21 all have the same inclination direction in the tire radial direction when going in a predetermined direction in the tire circumferential direction; however the inclination directions of the protrusion portions 30 and the first extending portions 51 need not be the same. For example, a plurality of protrusion portions 30 formed on one tire side surface 21 may be such that the inclination directions in the tire radial direction when going in a predetermined direction in the tire circumferential direction may be in opposite directions to each other for protrusion portions 30 adjacent to each other in the tire circumferential direction. In other words, a plurality of protrusion portions 30 formed on one tire side surface 21 may be such that by making the inclination directions of the protrusion portions 30 adjacent to each other in the tire circumferential direction opposite to each other, the protrusion portions 30 adjacent to each other in the tire circumferential direction are disposed in a V shape. By making the inclination directions of the protrusion portions 30 in the tire radial direction with respect to the tire circumferential direction opposite to each other, the protrusion portions 30 appropriately generate turbulence regardless of which direction the pneumatic tire 1 rotates, and it is possible to suppress an increase in air resistance and reduce the rolling resistance. In this way, fuel economy performance may be improved regardless of the rotation direction of the pneumatic tire 1.

EXAMPLES

FIGS. 24A to 24F are a tables listing the results of performance tests of pneumatic tires. Hereinafter, performance evaluation tests of the pneumatic tire 1 described above with respect to the conventional pneumatic tire and the pneumatic tire 1 according to the present technology will be described. Performance evaluation tests were performed in order to test for fuel economy performance and for scratch resistance.

The performance evaluation tests were performed by mounting a pneumatic tire 1 with a tire nominal size of 205/55R16 specified by JATMA on a JATMA standard rim wheel with a rim size of 16×6.5 J, adjusting the air pressure to 230 kPa, mounting the test tire on the evaluation vehicle with an engine displacement of 2000 cc, and then driving the evaluation vehicle.

Regarding the evaluation method of each test item, an evaluation vehicle equipped with test tires was subjected to a test run of 50 laps on a test course having a total length of 2 km at 100 km/h, and the fuel consumption due to the test run was measured. The fuel economy performance is indicated by an index in which the reciprocal of the measured fuel consumption is set to 100 in Conventional Example 2 described later. The larger this value is, the smaller the fuel consumption is and the better the fuel economy performance is.

Moreover, regarding scratch resistance, in an evaluation vehicle equipped with test tires, the tires were made to collide with a curb with a height of 100 mm at an approach angle of 45° and an approach speed of 10 km/h, the approach speed was gradually increased from 10 km/h, and the approach speed at which the tire burst was measured. The scratch resistance is indicated by an index of the approach speed leading to the burst, with the Conventional Example 2 described later being set as 100. The larger this value is, the less likely it is that bursts will occur, indicating that the scratch resistance is excellent.

The performance evaluation test was carried out on 22 types of pneumatic tires, or in other words, the pneumatic tires of Conventional Examples 1 and 2 which are examples of conventional pneumatic tires, and Examples 1 to 20 which are the pneumatic tires 1 according to the present technology. Of these, in the pneumatic tire of Conventional Example 1, the protrusion portions 30 are formed on the tire side portion 20, but the protrusion portions 30 do not include a bend portion 40. In the pneumatic tire of Conventional Example 2, the protrusion portions 30 are formed on the tire side portion 20, and the protrusion portions 30 include the bend portion 40;

however, the width of the extending portion 50 does not change at a position spanning the bend portion 40, and the maximum width of the first extending portion 51 is greater than 3.0 mm.

On the other hand, in Examples 1 to 20, which are examples of pneumatic tires 1 according to the present technology, all of the protrusion portions 30 include the plurality of extending portions 50 by the inclusion of the bend portion 40, and the first extending portion 51 having the longest length has a maximum width within a range of no less than 1.0 mm and no more than 3.0 mm. Furthermore, in the pneumatic tires 1 according to Examples 1 to 20, the maximum width of the second extending portion 52/the maximum width of the first extending portion 51, the maximum height of the first extending portion 51/the maximum width of the first extending portion 51, the maximum height of the second extending portion 52/the maximum width of the second extending portion 52, the angle θ1 between first extending portion 51 and the second extending portion 52, the length C1 of the first extending portion 51/the length C2 of the second extending portion 52, the position of the first extending portion 51 in the tire radial direction, the number of bend portions 40, the length C1 of the first extending portion 51/the length C3 of the third extending portion 53, the angle formed by the second extending portion 52 and the third extending portion 53, the angle between the third extending portion 53 and the fourth extending portion 54, the relationship between the first extending portion 51 and the third extending portion 53, the number of bend portions 40 continuous with the first extending portion 51, the position of the minimum height of the first extending portion 51, the change in height of the first extending portion 51, and the like are all different from each other.

As a result of performing performance evaluation tests using these pneumatic tires 1, as illustrated in FIGS. 24A to 24F, the pneumatic tires 1 according to Examples 1 to 20 were able to improve fuel economy performance and scratch resistance, respectively, with respect to Conventional Examples 1 and 2. In other words, the pneumatic tires 1 according to Examples 1 to 20 have both scratch resistance and fuel economy performance.

The invention claimed is:

1. A pneumatic tire, comprising:

a plurality of protrusion portions formed on at least one tire side portion of tire side portions located on both sides in a tire width direction, the protrusion portions projecting from a tire side surface that is a surface of the tire side portion and extending along the tire side surface, the protrusion portions comprising at least one bend portion at a position where a direction in which the protrusion portions extend changes, and also comprising a plurality of extending portions defined by the bend portion, a width of the plurality of extending portions changing at a position straddling the bend portion, a first extending portion, which is the extending portion having the longest length among the plurality of extending portions, having a maximum width within a range of no less than 1.0 mm and no more than 3.0 mm, and a thickness of the tire side portion at a maximum tire width position being within a range of no less than 3 mm and no more than 9 mm.

2. The pneumatic tire according to claim 1, wherein the plurality of extending portions are such that in one of the extending portions, a width with respect to a maximum width of the extending portions is within a range of no less than 0.8 and no more than 1.0 times the maximum width of the extending portions.

3. The pneumatic tire according to claim 1, wherein a maximum height of the first extending portion is within a range of no less than 1.1 and no more than 5.0 times a maximum width of the first extending portion.

4. The pneumatic tire according to claim 1, wherein the first extending portion is disposed on an outermost side in a tire radial direction among the plurality of extending portions.

5. The pneumatic tire according to claim 1, wherein the first extending portion is such that only one end portion side in the extending direction of the first extending portion is defined by the bend portion.

6. The pneumatic tire according to claim 1, wherein the first extending portion is such that a height from the tire side surface is lowest at an end portion on an outer side in a tire radial direction.

7. The pneumatic tire according to claim 1, wherein the first extending portion is such that a height from the tire side surface decreases going toward an outer side in a tire radial direction.

8. The pneumatic tire according to claim 1, wherein a second extending portion that is the extending portion continuous from the first extending portion via the bend portion has a maximum width that is larger than the maximum width of the first extending portion.

9. The pneumatic tire according to claim 8, wherein the maximum width of the second extending portion is within a range of no less than 1.5 and no more than 5 times the maximum width of the first extending portion.

10. The pneumatic tire according to claim 8, wherein a maximum height of the second extending portion is in a range of no less than 1.1 and no more than 3.0 times a maximum width of the second extending portion.

11. The pneumatic tire according to claim 8, wherein an angle $\theta 1$ formed by a center line in a width direction of the first extending portion and a center line in a width direction of the second extending portion is within a range $90° \leq \theta 1 \leq 170°$.

12. The pneumatic tire according to claim 8, wherein a length of the first extending portion is within a range of no less than 1.5 and no more than 30 times a length of the second extending portion.

13. The pneumatic tire according to claim 1, wherein the protrusion portions comprise a plurality of the bend portions.

14. The pneumatic tire according to claim 13, wherein the protrusion portions are such that a length of the first extending portion is within a range of no less than 1.2 and no more than 25 times a length of a second extending portion that is the extending portion of the plurality of extending portions that is continuous from the first extending portion via one of the bend portions and a length of extending portions other than the first extending portion.

15. The pneumatic tire according to claim 13, wherein protrusion portions are such that an angle $\theta n$ formed by center lines in respective width directions of two extending portions continuous via one of the bend portions is within a range $90° \leq \theta n \leq 170°$.

16. The pneumatic tire according to claim 13, wherein
the protrusion portions comprise a second extending portion that is an extending portion continuous from the first extending portion via one of the bend portions and a third extending portion that is an extending portion continuous from the second extending portion via another one of the bend portions, and
the first extending portion and the third extending portion are such that the center line in the width direction of the first extending portion and a center line in a width direction of the third extending portion are substantially parallel to each other.

17. A pneumatic tire, comprising:
a plurality of protrusion portions formed on at least one tire side portion of tire side portions located on both sides in a tire width direction, the protrusion portions projecting from a tire side surface that is a surface of the tire side portion and extending along the tire side surface,
the protrusion portions comprising at least one bend portion at a position where a direction in which the protrusion portions extend changes, and also comprising a plurality of extending portions defined by the bend portion,
a width of the plurality of extending portions changing at a position straddling the bend portion,
a first extending portion, which is the extending portion having the longest length among the plurality of extending portions, having a maximum width within a range of no less than 1.0 mm and no more than 3.0 mm, and
a thickness of the tire side portion at a maximum tire width position being within a range of no less than 2 mm and no more than 9 mm, wherein
a second extending portion that is the extending portion continuous from the first extending portion via the bend portion has a maximum width that is larger than the maximum width of the first extending portion,
the maximum width of the second extending portion is within a range of no less than 1.5 and no more than 5 times the maximum width of the first extending portion, and
a maximum height of the second extending portion is in a range of no less than 1.1 and no more than 3.0 times a maximum width of the second extending portion.

18. A pneumatic tire, comprising:
a plurality of protrusion portions formed on at least one tire side portion of tire side portions located on both sides in a tire width direction, the protrusion portions projecting from a tire side surface that is a surface of the tire side portion and extending along the tire side surface,
the protrusion portions comprising at least one bend portion at a position where a direction in which the protrusion portions extend changes, and also comprising a plurality of extending portions defined by the bend portion,
a width of the plurality of extending portions changing at a position straddling the bend portion,
a first extending portion, which is the extending portion having the longest length among the plurality of extending portions, having a maximum width within a range of no less than 1.0 mm and no more than 3.0 mm, and
a thickness of the tire side portion at a maximum tire width position being within a range of no less than 2 mm and no more than 9 mm, wherein
the plurality of extending portions are such that in one of the extending portions, a width with respect to a maximum width of the extending portions is within a range of no less than 0.8 and no more than 1.0 times the maximum width of the extending portions, and
the first extending portion is disposed on an outermost side in a tire radial direction among the plurality of extending portions.

* * * * *